United States Patent
Marciano et al.

(10) Patent No.: US 12,335,558 B2
(45) Date of Patent: Jun. 17, 2025

(54) SYNCHRONIZATION OF MULTIPLE CONTENT STREAMS

(71) Applicant: DAZN Media Israel Ltd., Herzliya (IL)

(72) Inventors: Matan Marciano, Karmiel (IL); Gil Shimon Lubliner, Hod Ha-Sharon (IL); Eyal Genis, Tel-Aviv (IL); Andrew Younan, Haifa (IL); Guy Zisman, Kibbutz Sdot Yam (IL); Gad Geffen, Matan (IL); Amir Shimoni, Matan (IL); Amir Segev, Gan Yoshiya (IL)

(73) Assignee: DAZN Media Israel Ltd., Herzliya (IL)

( * ) Notice: Subject to any disclaimer, the term of this patent is extended or adjusted under 35 U.S.C. 154(b) by 107 days.

(21) Appl. No.: 17/715,170

(22) Filed: Apr. 7, 2022

(65) Prior Publication Data
US 2023/0328308 A1    Oct. 12, 2023

(51) Int. Cl.
*H04N 21/435*  (2011.01)
*H04N 21/43*   (2011.01)
*H04N 21/44*   (2011.01)

(52) U.S. Cl.
CPC ..... *H04N 21/43072* (2020.08); *H04N 21/435* (2013.01); *H04N 21/44008* (2013.01)

(58) Field of Classification Search
CPC .......... H04N 21/43072; H04N 21/435; H04N 21/44008

(Continued)

(56) References Cited

U.S. PATENT DOCUMENTS

| 10,979,477 | B1 | 4/2021 | Cabrido et al. | |
| 2011/0122315 | A1* | 5/2011 | Schweiger | H04N 21/2365 348/E5.009 |

(Continued)

FOREIGN PATENT DOCUMENTS

| EP | 3304541 A1 | 4/2018 |
| GB | 2575873 A | 1/2020 |

(Continued)

OTHER PUBLICATIONS

Brownlee, J. (2020) How to Calculate Correlation Between Variables in Python—MachineLearningMastery.com.

*Primary Examiner* — Alfonso Castro
(74) *Attorney, Agent, or Firm* — The Roy Gross Law Firm, LLC; Roy D. Gross

(57) ABSTRACT

A computerized content synchronization system is configured to perform the following method: (a) obtain information indicative of multiple content streams, associated with a shared content; (b) provide algorithms, each algorithm configured to perform at least one of: identify, within the information, synchronization point(s) between the streams; calculate a timeline difference between the streams; and (c) responsive to a determination that the system does not possess, external to the information indicative of the streams, information concerning characteristics of a content pipeline architecture of each stream, which is capable of relating timelines of streams, perform the following: (i) choose an algorithm, based on defined criterion parameter(s) associated with algorithm characteristics, and on an analysis of the information; and (ii) run the chosen algorithm. This facilitates a synchronized consumption of the content by consumer(s), The consumer(s) is configured to consume the multiple content streams.

18 Claims, 11 Drawing Sheets

(58) Field of Classification Search
USPC .......................................................... 725/131
See application file for complete search history.

(56) References Cited

U.S. PATENT DOCUMENTS

| | | |
|---|---|---|
| 2011/0246908 A1 | 10/2011 | Akram et al. |
| 2012/0114307 A1* | 5/2012 | Yang .................. G06F 16/5838 386/278 |
| 2012/0198317 A1* | 8/2012 | Eppolito .............. G11B 27/034 715/202 |
| 2012/0311043 A1 | 12/2012 | Chen et al. |
| 2013/0216206 A1* | 8/2013 | Dubin .................. G11B 27/031 386/282 |
| 2014/0089990 A1* | 3/2014 | Van Deventer .... H04N 21/6587 725/115 |
| 2015/0120336 A1 | 4/2015 | Grokop et al. |
| 2015/0134724 A1 | 5/2015 | Hao et al. |
| 2016/0174010 A1 | 6/2016 | Mohammad et al. |
| 2016/0269771 A1 | 9/2016 | Bangma et al. |
| 2017/0093943 A1 | 3/2017 | Alsina et al. |
| 2017/0238058 A1 | 8/2017 | Wong et al. |
| 2018/0130482 A1 | 5/2018 | Michel et al. |
| 2018/0255332 A1* | 9/2018 | Heusser .................. H04H 20/18 |
| 2018/0295402 A1 | 10/2018 | Francisco |
| 2018/0352286 A1 | 12/2018 | Rennison et al. |
| 2019/0387313 A1 | 12/2019 | Bharitkar et al. |
| 2020/0314479 A1 | 10/2020 | Umansky et al. |
| 2021/0235149 A1 | 7/2021 | Madison et al. |
| 2021/0329317 A1 | 10/2021 | Dodson et al. |
| 2021/0352359 A1 | 11/2021 | Barvo et al. |

FOREIGN PATENT DOCUMENTS

| | | |
|---|---|---|
| KR | 20220017775 A | 2/2022 |
| WO | 2022030857 A | 2/2022 |

* cited by examiner

SYNCHRONIZATION OF MULTIPLE CONTENT STREAMS

TECHNICAL FIELD

The presently disclosed subject matter relates to synchronization of media content.

BACKGROUND

User devices are capable of receiving media content streams, e.g. via Adaptive bit Rate (ABR Streaming). The same content is in some cases provided via different and distinct content streams.

GENERAL DESCRIPTION

According to a first aspect of the presently disclosed subject matter there is presented a computerized content synchronization system, comprising a processing circuitry, the processing circuitry configured to perform a method, the method comprising performing the following:
  a. obtain, from one or more content delivery systems, information indicative of at least two content streams, the at least two content streams associated with a shared content;
  b. provide a plurality of algorithms, each algorithm of the plurality of algorithms being configured to perform at least one of: identify, within the information indicative of the at least two content streams, one or more synchronization points between the at least two content streams; calculate a timeline difference between the at least two content streams; and
  c. responsive to a determination that the computerized content synchronization system does not possess, external to the information indicative of the at least two content streams, information concerning characteristics of a content pipeline architecture of each content stream of the at least two content streams, which is capable of relating timelines of the at least two content streams, perform the following steps:
    i. choose an algorithm of the plurality of algorithms, based at least on at least one defined criterion parameter associated with algorithm characteristics, and on an analysis of the information indicative of the at least two content streams; and
    ii. run the chosen algorithm to at least one of: identify the at least one synchronization point; calculate the timeline difference,
thereby facilitating a synchronized consumption of the shared content by at least one consumer, wherein the at least one consumer is configured to consume the at least two content streams.

In addition to the above features, the method according to this aspect of the presently disclosed subject matter can include one or more of features (i) to (lxvi) listed below, in any desired combination or permutation which is technically possible:
  (i) the at least one consumer comprises at least two user devices, wherein each user device of the at least two user devices is configured to consume a distinct content stream of the at least two content streams.
  (ii) the at least two content streams are at least one of: associated respectively with at least two distinct content pipelines; associated respectively with at least two distinct content delivery protocols.
  (iii) the at least one defined criterion parameter comprises at least one of: a complexity criterion, a probability parameter, a parameter of required synchronization quality, an indication of past content characteristics associated with at least one content stream of the at least two content streams, and an indication of DRM integration of the computerized content synchronization system.
  (iv) the complexity criterion comprises at least one of a computational complexity, a storage-needs complexity and a communications bandwidth complexity, and a requirement for DRM.
  (v) the analysis of the information indicative of the at least two content streams comprises a determination that the at least one media container is readable by the computerized content synchronization system.
  (vi) the at least one defined criterion parameter is associated with algorithm characteristics.
  (vii) the at least one defined criterion parameter, associated with algorithm characteristics, is associated with algorithm performance.
  (viii) the at least one defined criterion parameter comprises an indication of DRM integration of the computerized content synchronization system.
  (ix) the at least one defined criterion parameter comprises an indication of past content characteristics associated with at least one content stream of the at least two content streams.
  (x) the indication of past content characteristics is derived at least partially using machine learning.
  (xi) the probability parameter is based at least partly on the indication of past content characteristics.
  (xii) the information indicative of the at least two content streams comprising at least one of a content payload and content metadata.
  (xiii) the information indicative of the at least two content streams comprises a manifest, wherein the analysis of the information indicative of the at least two content streams comprises an analysis of timeline information comprised in the manifest.
  (xiv) the information comprises a plurality of segment sizes.
  (xv) the information comprises at least one media container.
  (xvi) the at least one media container is at least one of a video container and an audio container.
  (xvii) the information comprises at least one of: at least a portion of a video payload; at least a portion of an audio payload.
  (xviii) the least one media container comprises respective media containers comprised in the each content stream, wherein the respective media containers comprise corresponding decode times associated with the each content stream, wherein the analysis of the information indicative of the at least two content streams comprises an analysis of the corresponding decode times.
  (xix) the analysis of the information indicates that at least one content stream of the at least two content streams is protected using Digital Rights Management (DRM).
  (xx) the timeline difference comprises a manifest timeline difference.
  (xxi) the choosing of an algorithm comprises choosing a set of candidate algorithms of the plurality of algorithms.
  (xxii) the at least one defined criterion parameter comprises a probability parameter, the probability parameter being indicative of a probability of success using a particular algorithm of the plurality of algorithms.

(xxiii) the at least one defined criterion parameter comprises a parameter of required synchronization quality, wherein the choosing of the algorithm is based at least partly on an expected synchronization quality associated with the algorithm.

(xxiv) the at least one defined criterion parameter comprises a parameter of required synchronization quality, wherein the running of the algorithm comprises providing a quality score,
wherein, responsive to the quality score not meeting the parameter of required synchronization quality,
the method further comprises performing said steps (i) and (ii) in respect of a next-choice algorithm.

(xxv) the choosing of an algorithm comprises performing an incremental algorithm selection,
wherein, responsive to, in said step (ii), the one or more synchronization points are not identified or the timeline difference is not calculated,
the method further comprises performing said steps (i) and (ii) in respect of a next-choice algorithm.

(xxvi) the incremental algorithm selection is performed at least partly in a pre-defined order, the pre-defined order being based at least on the at least one defined criterion parameter.

(xxvii) the incremental algorithm selection is performed at least partly in a pre-defined order, the pre-defined order being based at least on the at least one defined criterion parameter.

(xxviii) the at least one defined criterion parameter comprises the complexity criterion, wherein the incremental algorithm selection is based on choosing the next-choice algorithm based on an order of increased complexity.

(xxix) the plurality of algorithms comprises a manifest timeline algorithm, wherein the manifest timeline algorithm is configured to identify an at least partial overlap of respective manifest timelines in respective manifests associated with the at least two content streams.

(xxx) the manifest timeline algorithm is further configured, in response to the identifying of the overlap, to identify a successive sequence of segments of a configured length that corresponds to same segment times,
wherein, responsive to identifying the successive sequence, the manifest timeline algorithm is further configured to identify the at least at least one synchronization point based on the successive sequence.

(xxxi) more generally, the chosen algorithm is further configured, in response to at least one of the identification of the at least one synchronization point and the calculation of the timeline difference, to identify a successive sequence of segments of a configured length in which at least one of: synchronization points are identified and the timeline difference is calculated,
wherein, responsive to identifying the successive sequence, the chosen algorithm is further configured to perform, based on the successive sequence, at least one of the identification of the at least at least one synchronization point and the calculation of the timeline difference.

(xxxii) the plurality of algorithms comprises a segment size correlation algorithm, the segment size correlation algorithm configured to calculate correlation between successive segment sizes of respective content segments of the at least two content streams over time, wherein, responsive to finding a correlation based on the calculated correlation level, the segment size correlation algorithm is further configured to identify the at least at least one synchronization point based on correlated segments of the at least two content streams over time.

(xxxiii) the finding of the correlation comprises the calculated correlation level being above a pre-defined correlation score.

(xxxiv) the segment size correlation algorithm utilizes Pearson's correlation.

(xxxv) the plurality of algorithms comprises a media container algorithm,
the media container algorithm configured to identify at least one identical decode time in respective media containers of at least some respective content segments of the at least two content streams,
wherein, responsive to identifying the at least one identical decode time, the media container algorithm is further configured to identify the at least at least one synchronization point, based on the least one identical decode time.

(xxxvi) the plurality of algorithms comprises a content payload algorithm,
the content payload algorithm configured to identify a correlation of content in respective content segments of the at least two content streams,
wherein, responsive to identifying the correlation of content, the content payload algorithm is further configured to identify the at least one synchronization point, based on the respective content segments.

(xxxvii) the identifying of the correlation of content comprises performing analysis of compressed video headers.

(xxxviii) the respective content segments comprise respective media frames, which comprise at least one of: one or more image frames; one or more audio frames.

(xxxix) the identifying the correlation of content in the respective content segments comprises performing at least one of: a comparison of file size, a checksum and a cyclic redundancy check (CRC).

(xl) the identifying the correlation of content comprises analyzing codec headers and looking for Supplemental Enhancement Information (SEI) pic_timing messages.

(xli) The identifying the correlation of content comprises comparing at least one of a visual similarity and an audio similarity of the respective media frames.

(xlii) the identifying the correlation of content comprises comparing image and/or audio data of respective media frames.

(xliii) the plurality of algorithms comprises an artificial intelligence algorithm, the artificial intelligence algorithm configured to identify a correlation of a context of content in in respective content segments of the at least two content streams, the identification performed utilizing machine learning,
wherein, responsive to identifying the correlation of the context of the content, the artificial intelligence algorithm is further configured to, based on the respective content segments, at least one of: identify the at least at least one synchronization point, or to calculate the timeline difference.

(xliv) the choosing of the algorithm comprises choosing the algorithms in the following order:
a. a manifest timeline algorithm;
b. a segment size correlation algorithm;

c. a media container algorithm;
d. a content payload algorithm; and
e. an artificial intelligence algorithm.
(xlv) the at least two content streams comprise Adaptive Bit Rate (ABR) content streams.
(xlvi) the one or more content delivery systems are comprised in one or more content pipelines, the one or more content pipelines further comprising a content preparation system and/or a content delivery system, wherein the determination that the computerized content synchronization system does not possess comprises at least one of the following:
A. a determination that the computerized content synchronization system is not integrated with the one or more content pipelines;
B. a determination that the computerized content synchronization system lacks information whether the at least two content streams are associated with a single content-capture device;
C. a determination that the computerized content synchronization system lacks information whether the at least two content streams are associated with the single encoder, the single encoder utilizing Encoder Boundary Point (EBP) based packaging;
D. a determination that the content streams are associated with more than one encoder, utilizing Encoder Boundary Point (EBP) based packaging, and the encoders are time synched;
E. a determination that the content streams are associated with a single encoder, and utilize e.g. AVC and HEVC SEI pic timing messages;
F. a determination that the content streams are associated with more than one encoder, utilizing e.g. AVC and HEVC SEI pic timing messages, and the encoders are time synched;
G. a determination that the computerized content synchronization system lacks information whether the at least two content streams are associated with a single transcoder;
H. a determination that the computerized content synchronization system lacks information whether the at least two content streams are associated with a single packager;
I. the content streams are associated with more than one packager, utilizing EBP or SEI in the source for packaging;
J. the content streams are associated with more than one packager, which are time synched between each other; and
K. a determination that the computerized content synchronization system lacks information about a packager protocol utilized by each content stream.
(xlvii) the method further comprising the following:
d. responsive to a determination that the computerized content synchronization system possesses, external to the information indicative of at least two content streams, the information concerning characteristics of the content pipeline architecture, perform the following steps:
i. choose the algorithm of the plurality of algorithms, based at least on the information concerning characteristics of the at content pipeline architecture.
(xlviii) the algorithm chosen in said step (d)(i) functions as a first-choice algorithm.
(xlix) the method further comprises:
e. output the timeline difference to at least one consumer system.
(l) the at least two user devices are performing the shared consumption of the shared content,
wherein the at least two user devices are synchronized to a common content time position,
the common content time position being associated with the shared consumption of the content,
wherein the method further comprises:
selecting a second time position, associated with one content stream of the at least two content streams,
setting the second time position to constitute the common content time position.
(li) the selection of the second time position is based on the second time position being associated with a maximum time delay from a time associated with generation, preparation, and/or transmission of the shared content.
(lii) the at least two user devices are performing the shared consumption of the shared content,
wherein the at least two user devices are synchronized to a common content time position,
the common content time position being associated with the shared consumption of the content, wherein the method further comprises:
f. determining a second time difference between a content stream and the common content position; and
g. determining a content-stream-specific common content position, based at least on the common content position and the determined time difference.
(liii) the method further comprises:
h. repeating the said steps (i) to (ii) at least once, for another point in time associated with the at least two content streams.
(liv) a second algorithm chosen during a second performance of said step (i) differs from a first algorithm chosen during a first performance of said step (ii).
(lv) the method further comprises:
responsive to obtaining, from the content delivery system, information indicative of an additional content stream, the additional content stream associated with the shared content, setting the at least two content streams to comprise the additional content stream; and
repeat the performance of said steps (c)(i), (c)(ii) and (d), in respect of the at least two content streams.
(lvi) each algorithm of the plurality of algorithms are configured to identify, within the information indicative of the at least two content streams, one or more synchronization points between the at least two content streams, and to calculate a timeline difference between the at least two content streams. the information comprises at least one segment boundary time (e.g. time stamp) associated with each content stream.
(lvii) the one or more content delivery systems are comprised in one or more content pipelines, the content pipeline further comprising one or more content preparation systems.
(lviii) the content-capture device comprises at least one of an image capture device or audio-capture device.
(lix) the content-capture device comprises at least one of camera and a microphone.
(lx) corresponding packagers of the at least two distinct content pipelines are distinct packagers.
(lxi) the distinct packagers implement distinct content delivery protocols.
(lxii) the corresponding content-capture devices associated with the at least two content streams are distinct.
(lxiii) the one or more content delivery systems comprise one or more Content Delivery Networks (CDN).

(lxiv) the information indicative of the at least two content streams comprising stream identification information.

(lxv) the stream identification information comprises a distinct Universal Resource Locator (URL) corresponding to each content stream of the at least two content streams.

(lxvi) the shared content comprising at least one of a video content, an audio content, and a text content.

According to a second aspect of the presently disclosed subject matter there is presented a computerized content synchronization method, capable of being performed by a computerized content synchronization system comprising a processing circuitry, the method comprising performing the following:

a. obtain, from one or more content delivery systems, information indicative of at least two content streams, the at least two content streams associated with a shared content b. provide a plurality of algorithms, each algorithm of the plurality of algorithms being configured to perform at least one of: identify, within the information indicative of the at least two content streams, one or more synchronization points between the at least two content streams; calculate a timeline difference between the at least two content streams; and c. responsive to a determination that the computerized content synchronization system does not possess, external to the information indicative of at least two content streams, information concerning characteristics of a content pipeline architecture of each content stream of the at least two content streams, which is capable of relating timelines of the at least two content streams, perform the following steps:

i. choose an algorithm of the plurality of algorithms, based at least on at least one defined criterion parameter associated with algorithm characteristics, and on an analysis of the information indicative of the at least two content streams; and ii. run the chosen algorithm to at least one of: identify the at least one synchronization point; calculate the timeline difference, B. thereby facilitating a synchronized consumption of the shared content by at least one consumer, wherein the at least one consumer is configured to consume the at least two content streams.

According to a second aspect of the presently disclosed subject matter there is presented a non-transitory computer readable storage medium tangibly embodying a program of instructions that, when executed by a computerized content synchronization system, cause the computer to perform a computerized method, the method being performed by a processing circuitry of the computerized content synchronization system and comprising performing the following actions:

a. obtain, from one or more content delivery systems, information indicative of at least two content streams, the at least two content streams associated with a shared content b. provide a plurality of algorithms, each algorithm of the plurality of algorithms being configured to perform at least one of: identify, within the information indicative of the at least two content streams, one or more synchronization points between the at least two content streams; calculate a timeline difference between the at least two content streams; and c. responsive to a determination that the computerized content synchronization system does not possess, external to the information indicative of at least two content streams, information concerning characteristics of a content pipeline architecture of each content stream of the at least two content streams, which is capable of relating timelines of the at least two content streams, perform the following steps:

(i) choose an algorithm of the plurality of algorithms, based at least on at least one defined criterion parameter associated with algorithm characteristics, and on an analysis of the information indicative of the at least two content streams; and (ii) run the chosen algorithm to at least one of: identify the at least one synchronization point; calculate the timeline difference, thereby facilitating a synchronized consumption of the shared content by at least one consumer, wherein the at least one consumer is configured to consume the at least two content streams.

The computerized systems and the non-transitory computer readable storage media, disclosed herein according to various aspects, can optionally further comprise one or more of features (i) to (lxvi) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
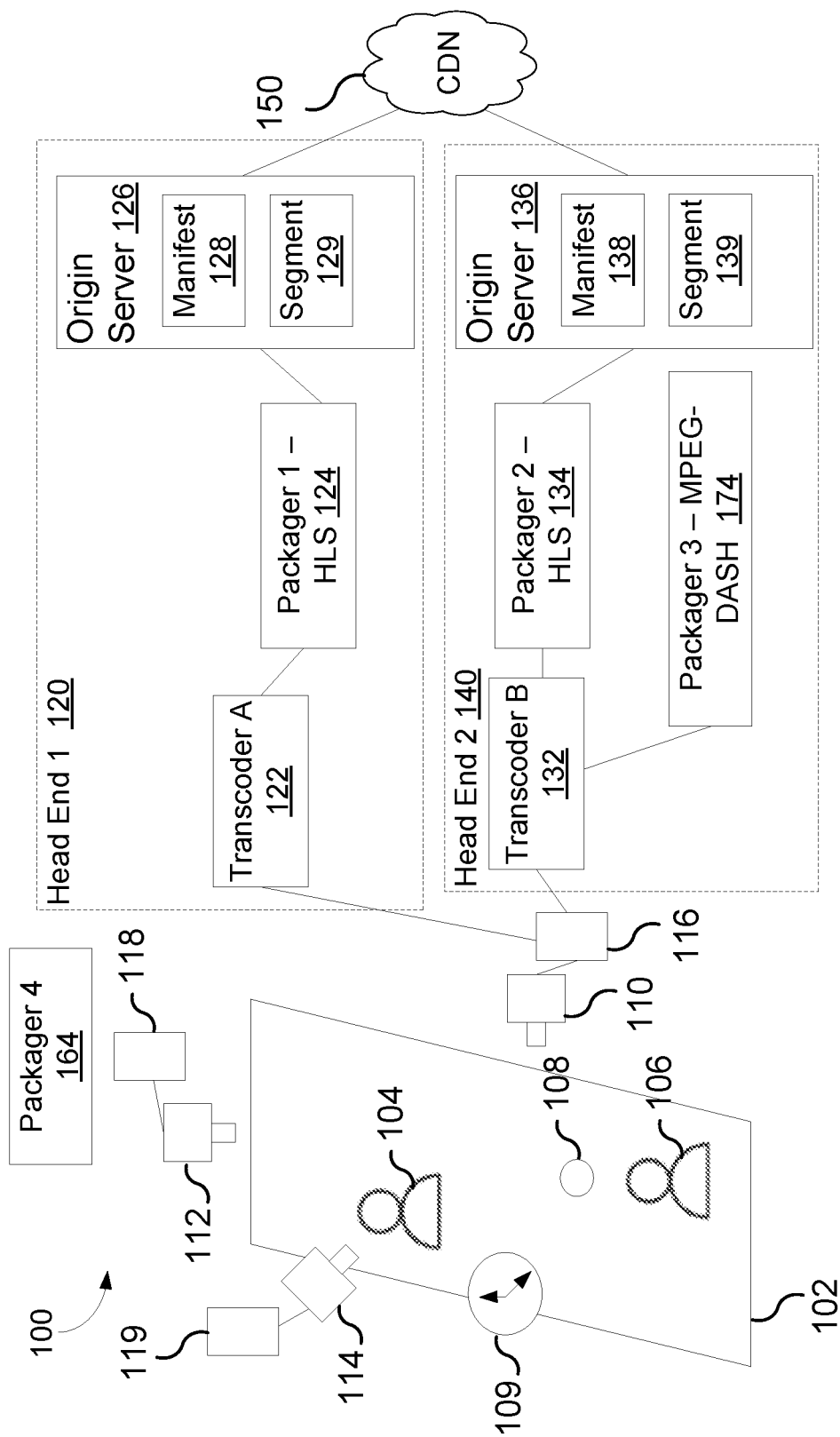
FIG. 1 illustrates schematically an example generalized view of an entire video Over-The-Top (OTT) pipeline, in accordance with some embodiments of the presently disclosed subject matter.

In the drawings and descriptions set forth, identical reference numerals indicate those components that are common to different embodiments or configurations.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

Unless specifically stated otherwise, as apparent from the following discussions, it is appreciated that throughout the specification discussions utilizing terms such as "providing", "presenting", "receiving", "performing", "checking", "recording", "detecting", "generating", "setting" or the like, refer to the action(s) and/or process(es) of a computer that manipulate and/or transform data into other data, said data represented as physical, e.g. such as electronic or mechanical quantities, and/or said data representing the physical objects. The term "computer" should be expansively construed to cover any kind of hardware-based electronic device with data processing capabilities including a personal computer, a server, a computing system, a communication device, a processor or processing unit (e.g. digital signal processor (DSP), a microcontroller, a microprocessor, a field programmable gate array (FPGA), an application specific integrated circuit (ASIC), etc.), and any other electronic computing device, including, by way of non-limiting example, computerized systems or devices 210, 280, 405 and processing circuitry 215, 415 disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

The terms "non-transitory memory" and "non-transitory storage medium" used herein should be expansively construed to cover any volatile or non-volatile computer memory suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases", "one example", "some examples", "other examples", or variants thereof, means that a particular described method, procedure, component, structure, feature or characteristic described in connection with the embodiment(s) is included in at least one embodiment of the presently disclosed subject matter, but not necessarily in all embodiments. The appearance of the same term does not necessarily refer to the same embodiment(s) or example(s).

Usage of conditional language, such as "may", "might", or variants thereof, should be construed as conveying, that one or more examples of the subject matter may include, while one or more other examples of the subject matter may not necessarily include, certain methods, procedures, components and features. Thus such conditional language is not generally intended to imply that a particular described method, procedure, component or circuit is necessarily included in all examples of the subject matter. Moreover, the usage of non-conditional language does not necessarily imply that a particular described method, procedure, component or circuit is necessarily included in all examples of the subject matter.

It is appreciated that certain embodiments, methods, procedures, components or features of the presently disclosed subject matter, which are, for clarity, described in the context of separate embodiments or examples, may also be provided in combination in a single embodiment or examples. Conversely, various embodiments, methods, procedures, components or features of the presently disclosed subject matter, which are, for brevity, described in the context of a single embodiment, may also be provided separately or in any suitable sub-combination.

It should also be noted that each of the figures herein, and the text discussion of each figure, describe one aspect of the presently disclosed subject matter in an informative manner only, by way of non-limiting example, for clarity of explanation only. It will be understood that the teachings of the presently disclosed subject matter are not bound by what is described with reference to any of the figures or described in other documents referenced in this application.

Figure 2:
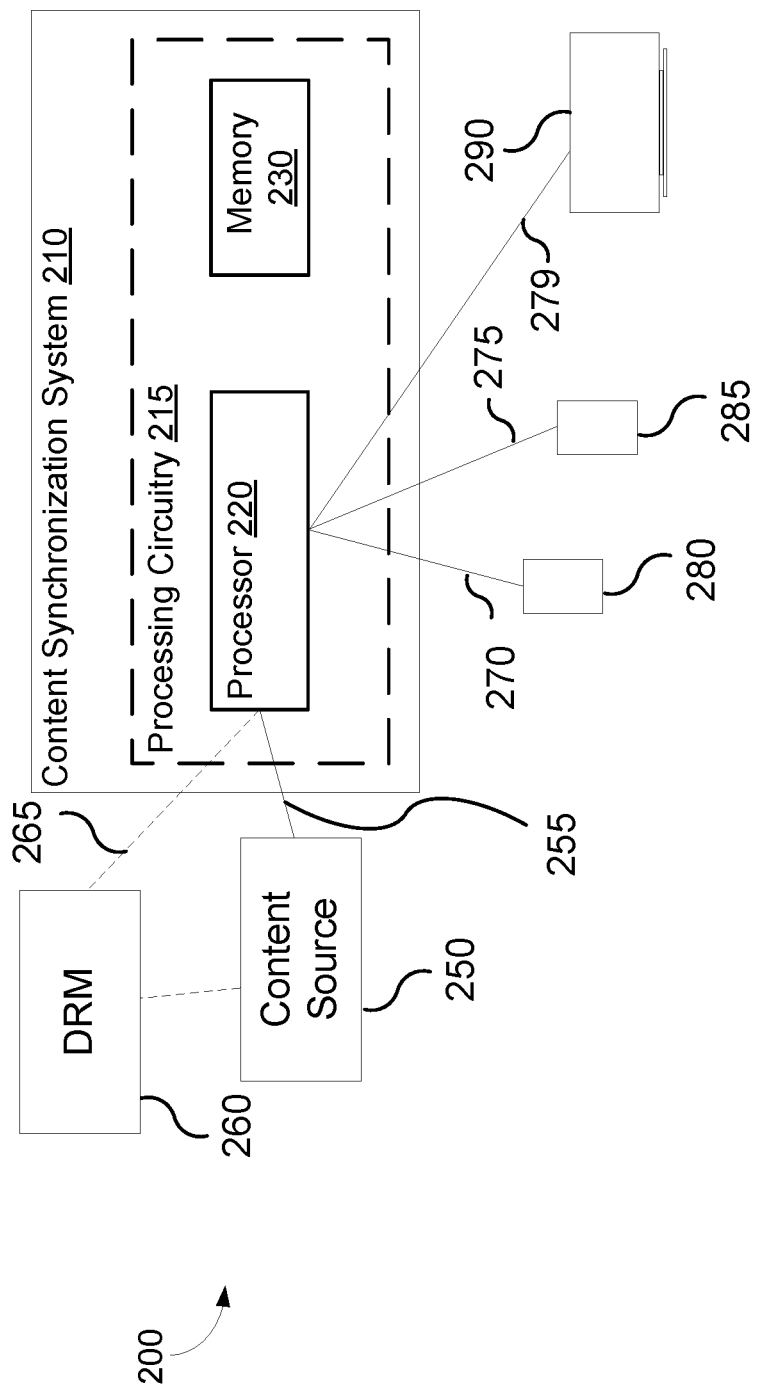
FIG. 2 illustrates schematically an example generalized view of content consumption, in accordance with some embodiments of the presently disclosed subject matter.

Bearing this in mind, attention is drawn to FIG. 1, schematically illustrating an example generalized view of an entire video Over-The-Top (OTT) pipeline, in accordance with some embodiments of the presently disclosed subject matter. Example scenario 100 depicts production and preparation of a media content, and its delivery towards consumers. FIG. 2, disclosed further herein, discloses consumption of the content by multiple user devices, and possible synchronization challenges involved in such consumption.

The example case of the figure, of an entire OTT video (or other content) pipeline, is constructed of content production, headend(s) and a content delivery network.

In the non-limiting example of the figure, the content comprises video and/or audio captures of a live event such as a sports game. as sport game. An example is a football game. Two players 104, 106 are shown, as is ball 108, on the football or other playing field 102. A clock 109 in the stadium (not shown) displays the time. In the example, the game play is captured by three media capture devices 110, 112, 114, e.g. image capture devices, e.g. video or still cameras. The media capture devices are referred to herein also as content capture devices 110, 112, 114. Note that in some examples a device such as a video camera captures both video/image and audio content.

Note that each camera, in the example of the figure, captures different images, since they are located at different positions relative to the field, and are pointed in different directions. For example, camera 110 is positioned at the midfield, and aims across the length of the field. Camera 112 is positioned at one of the goals, and it aims towards the field from that end. Camera 114 is positioned at a relatively high position, and it captures images from above, looking down at the field. The example content to be generated and delivered is a TV broadcast or other video-format transmission of the football game.

Note that other media formats are possible. For example, not shown are content capture devices such as audio-capture devices, e.g. microphones, which capture the same football game, but as audio content, for e.g. an on-line radio broadcast. In some non-limiting examples, the content generated and transmitted is a film or a television show.

In the example, each imaging device is operatively coupled to, comprises, or is otherwise associated with, a respective encoder or encoders 116, 118, 119. The encoders are configured to encode the captured media content into a particular media format, and in some cases compress the media content.

In some cases, at the venue there is high availability of encoders. For example, each camera 110 is connected to two encoders 116.

In one common implementation, the audio feed of e.g. a sports commentator (not shown in the figure), e.g. sitting in the venue, is fed into the encoder 116, which can in some cases mux it with the video stream.

Encoder 116 is operatively coupled to one or more head ends. The figure shows the example of two head-ends 120, 140. For simplicity of exposition, the head-ends associated with encoders 118, 119 are not shown. In the example, each head-end comprises one or more transcoders 122, 132. The transcoders are configured to transcode the content, e.g. the video stream incoming from the encoder 116. The media is in some cases transcoded into multiple resolutions and bitrates, so that it can be consumed by various types of devices, over various types and qualities of networks, which can each support some of the resolutions and bitrates.

In the example, each head-end comprises one or more packagers 124, 134. Each transcoder 122, 132 is operatively coupled to one or more packagers. The figure shows the non-limiting example of one packager 124, 134 in each head end, one packager per transcoder. In some examples, the packager 124 is a packaging service or software. For example, in some implementations of Adaptive Bit Rate (ABR) streaming, the packager is configured to split each rendition of the content in smaller segments 129, 139 or pieces, for example each of a specific duration. The packager 124 also indicates how it split the videos (or other media), and the order in which the segments should be delivered to consumers, in a manifest, e.g. a text file.

In some cases, in the head end 1 there is high availability of packagers 124, that is the head end comprises more than one packager, for availability and/or capacity reasons.

In the example, each head-end comprises one or more origin servers 126, 136. In some cases, the packager(s) 124, 134 stores the manifest(s) 128, 138 in the origin server(s) 126, 136. In some cases, the packager(s) 124, 134 stores the segment(s) 129, 139 of the content in the origin server(s) 126, 136.

In the example of the figure, packager 1 124 and packager 2 134 package the ABR content using the Hypertext Transfer Protocol (HTTP) Live Streaming (HLS) delivery protocol. The HLS protocol is used by devices of Apple™ Inc. In other examples, the packager(s) use the Moving Picture Experts Group—Dynamic Adaptive Streaming Over HTTP (MPEG-DASH or DASH) delivery protocol, to package ABR content. The DASH protocol is used, for example by Android™ devices. This use is illustrated in the figure by an additional MPEG-DASH packager 3 174. In the non-limiting example of the figure, both HLS packager 134 and DASH packager 174 are comprised in the same head end 140. In some examples, packager 3 is associated with the same encoder 116 and camera 110 which is connected to packagers 1 and 2. Also Head End 1 120 can in some cases have a packager supporting two different protocols, but this is not shown, for ease of exposition.

The example of other encoders and cameras being connected to other head ends is illustrated in the figure by the packager 4 164, associated with imaging device 112 and encoder 118. For ease of exposition, this other head end is not shown in the figure, nor is the connection between packager 164 and encoder 118.

In some other examples, a single packager 124 can support multiple protocols, e.g. both HLS and DASH.

Note that each component, e.g. each packager, may have its own clock, and they may not be time-synchronized with each other. This may be true also for e.g. two packagers 134, 174 within the same head end 140.

In some examples, the in-venue components, such as content capture device 110 and encoder 116, are referred to "content production" or a "content production system(s)". in combination with the transcoder A 122 and packager 1 124, are referred to herein also as a content preparation system. The content preparation system, using the origin server 126, delivers the content to consumers such as end user devices (see e.g. FIG. 2) via one or more content delivery systems 150. In some examples, the content delivery system(s) comprises one or more Content Delivery Networks (CDN) 150. In some examples, the combination of head end components (transcoder(s) 122, packager(s) 124, origin server(s) 126), together with CDN(s) or other content delivery system(s) 150, to the user device, are referred to herein also as content pipeline(s).

In at least this sense, the content pipeline can comprise content preparation system(s).

Attention is drawn to FIG. 2, schematically illustrating an example generalized view of content consumption, in accordance with some embodiments of the presently disclosed subject matter. The example content consumption scenario 200 illustrates at least certain challenges with synchronization of multiple content streams 255.

In the scenario, several different end devices wish to consume the same shared content. In the example of the figure, user device 280 is an Apple™ device such a smartphone, and user device 285 is an Android™ device such a smartphone. User device 290 is, for example, a living room device such as a smart television set connected to the Internet. These devices want to receive the media content from one or more content sources 250, e.g. content delivery system(s) 150 such as CDN(s). In some examples, the content is obtained utilizing client controlled protocols, e.g. using adaptive bitrate (ABR) streaming techniques. In some other examples, the content is pushed towards the user devices.

In some examples, the source(s) of the content is ABR transmitted Over the Top (OTT).

In some examples, two different user devices 280, 285 download the same shared content in two different content streams 255. In the non-limiting example of ABR streaming, an Apple™ device 280 can stream using the HLS protocol, while an Android™ device 285 can stream using MPEG-DASH. Thus, more generally, multiple user devices receive the same shared content, e.g. a broadcast of the same football game, in two or more different content streams. Another example of multiple content streams, associated with the same content, is that device 280 is watching the video of the game captured by camera 110, device 285 is watching the video captured by camera 112, and device 290 is watching the video captured by camera 114. That is, the corresponding content-capture devices 110, 112, 114 associated with the multiple content streams are distinct. Another example is two user devices streaming content which was captured by a single imaging device 110, but went through two different encoders, and/or two different transcoders, and/or two distinct packagers. In some examples, the distinct packagers implement distinct content delivery protocols (e.g. HLS vs DASH). There is a need in some cases to synchronize the timelines of these multiple content streams, as will now be disclosed.

Note that "distinct content pipelines" refers, in some examples, also to pipelines which only partially share components—for example, they use the same transcoder but different packagers.

In some examples, the multiple devices 280, 285, 290 are consuming a content, so as to play it, e.g. watching a television (TV) broadcast or other program, in a shared manner with each other. In some examples, a group of friends are watching the same TV show or other content, from different physical locations, and they are communicating with each other during the watching. For example, an application running on each of their user devices 280, 285, 290 is configured to enable them to talk with each other, doing text chats with each other etc. This shared consumption is referred to herein, in some examples, also as a joint watching, a watching party, a joint watching session, or more generally a joint content consumption session.

In some non-limiting examples, the watching party or other shared consumption involves synchronized consumption of the shared content. For example, it may involve a synchronization of the delivery and/or display/presentation of the TV show among all of the group members, to within a defined tolerance that enables them to follow together the shared consumption. That is, for example, the three users depicted will, ideally, all see and hear, at approximately the same time, the sports announcer shout "Goal!", so that they can react to each other, at the same time, to the same viewed/consumed portion of the movie/broadcast/other content. In some such examples, the various user devices 280, 285, 290 of the participants, are therefore all synchronized to a common or shared content time position.

In some examples, this shared, synchronized, consumption of a shared content by a group of users 280, 285, 290 is referred to herein as a virtual "room", or as a shared content virtual room, distinguished from e.g. the physical room or other space (not shown) in which each user device is physically is located.

More example disclosure concerning shared content consumption, and synchronization of consumption across multiple devices, e.g. within a virtual room, can be found in the U.S. application Ser. No. 17/687,917, "Method of Facilitating a Synchronized Play of Content and System Thereof", the contents of which are incorporated herein by reference. More example disclosure concerning acoustic signal cancelling which can be advantageous in some such cases, and synchronization of "reference signals" associated with such signal cancelling, e.g. within a virtual room, can be found in the U.S. application Ser. No. 17/693,585, "Acoustic Signal Cancelling", the contents of which are incorporated herein by reference.

In use cases such as the above non-limiting example of a shared virtual "room", where the user devices are to synchronize with each other, it is advantageous that the timelines of the multiple content streams be synchronized. For example, it can be, that at the moment when a goal is kicked in the game, the HLS content stream will show a time stamp of 10:01:02.900, while the DASH content stream shows, for that same moment, a stamp time of 10:01:02.980. Thus, there is a timeline difference between the two streams. In such a case it can be important for the two user devices 280, 285 to know that the streams differ by 0.080 second in their timelines, so as to synchronize between each other, and/or to a shared virtual room position, in the most accurate manner.

One exemplary reason for the timeline differences between the multiple content streams is that at least some distinct components in the different streams have different clocks and timing.

While the case of multiple user devices is discussed in much of the presently disclosed subject matter, this is done only for purposes of ease of exposition, as is only non-limiting example case. More generally, there is disclosed herein the synchronized consumption of the shared content by at least one consumer, where the at least one consumer is configured to consume the at least two content streams. For example, the single user device 280 can consume multiple content streams, which can require synchronization between them. One example of this is user device 280 viewing the sports game in a split screen mode, where each video stream viewed is captured by a different camera, viewing the game from a different angle. The two streams should be synchronized. In another non-limiting example, device 280 receives the video, without sound, in one content stream, and the audio, alone, in another content stream, and the two should be synchronized. In still another non-limiting example, device 280 receives the video stream of the game, and also receives a different data stream, e.g. text chat, in another stream. The two streams should be synchronized for presentation.

The figure therefore shows a content synchronization system 210. Since at least one function of it is to synchronize the content streams 255 arriving from e.g. multiple OTT pipelines 250 (e.g. using multiple cameras, transcoders, packagers, CDNs etc.), it is referred to herein in some examples also as a multiple-content sources content synchronization system 210. The system 210 in some examples receives content streams 255 from the multiple content sources 250. In at least this sense system 210 consumes the content. The system 210 in some examples sends information 270, 275, 279 indicative of the timeline differences to the user devices 280, 285, 290, e.g. as disclosed herein.

In some examples, system 210 is a back-end system.

In some non-limiting examples, content synchronization system 210 includes a computer. It may, by way of non-limiting example, comprise a processing circuitry 215.

This processing circuitry may comprise a processor 220 and a memory 230.

Figure 3:
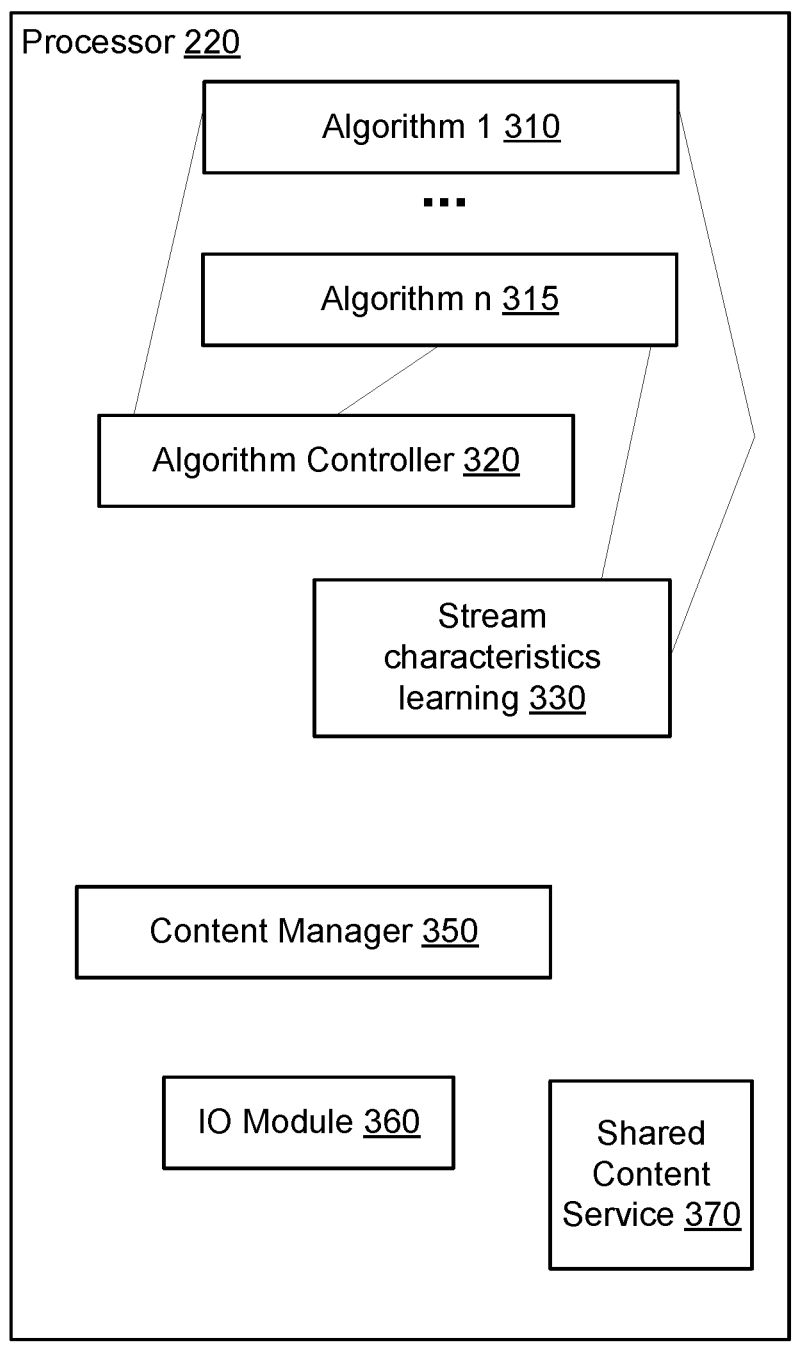
FIG. 3 illustrates schematically an example generalized schematic diagram comprising a processor, in accordance with some embodiments of the presently disclosed subject matter.

Example functional modules of processor 220 are disclosed further herein with reference to FIG. 3.

In some examples, memory 230 of processing circuitry 210 is configured to store data associated with at least the receipt and synchronization of multiple content streams 255.

In some examples, each content stream is associated with information that is indicative of that stream, for example stream identification information. In one non-limiting example, the stream identification information comprises a distinct Universal Resource Locator (URL) which corresponds to each content stream. In some examples, content streams of different URLs are downloaded from different CDNs/content delivery networks 150. The synchronization of the content stream timelines can in some cases be performed using algorithms such as those disclosed further herein. It is in some examples advantageous for content synch system 210 to choose, and use, that algorithm(s) which will best facilitate the synchronization, e.g. those which run most efficiently in terms of computer resources, and/or those which have the highest probability of synching the streams accurately.

In some examples, the choice of algorithm is made easier due to information concerning the content streams, which is available to the content synchronization system 210 external to the content stream 255 itself. That is, external to the information indicative of at least two content streams 255 which is received from the content delivery system 250, the synchronization system 210 has access to information concerning characteristics of the content pipeline architecture of each content stream 255—information which is capable of relating timelines of the two content streams.

One example case is where there is integration between system 210 and one or more content pipelines 250. In one such example, the system 210 has a priori information from the content provider, e.g. that stream 1 and stream 2 use different cameras. It can choose the best algorithm based on that information, in some cases—without having to first analyze the content streams themselves (e.g. manifests or content payload) in order to make the algorithm choice. (Note that the chosen algorithm itself, when run, is in some examples configured to analyze the content streams.). Other non-limiting examples of integration are disclosed further herein. In another example case, the content synchronization system 210 receives, in parallel to receiving the content streams 255, out of band information (not shown), e.g. in real time or near-real time. This out of band, alternate data stream, is received along with the content stream. It can provide information about the content stream(s) 255, which can be used to help determine the timeline of each stream and the relationship between timelines. This out of band data stream can in some cases be considered another example of integration between system 210 and the content pipeline 250.

However, in some other examples, the content synchronization system 210 does NOT have access to information concerning the content streams, which is external to the content stream 255 itself. One non-limiting example of such a case is where the content synchronization system 210 is configured to function merely as a media player client of an OTT pipeline. For example, the system 210 is a standalone service, not associated with the content provider, and it accesses the content stream in the same manner that the media players on user devices such as 285, 290 access the stream. In such cases, the content synch system has no special integration with content pipelines 250. It has no involvement in the preparation flow of the video or other content. Also, it does not have access to out-of-band streams of data which contain the needed information to help it synch the content streams from the different OTTs or other content sources.

In some examples, the system 210 does not even receive protocol information, e.g. does not received the files extensions.

The choice of algorithm must, in such a case, be made without this additional information which is external to the content streams 255 themselves. There is not available information concerning the content pipeline(s) architectures, external to the content streams 255 themselves, which would enable a quick and obvious choice of the algorithm to use, without requiring analysis of the content stream (e.g. manifests or content payload) in order to make the choice of the most appropriate algorithm, that is the algorithm which expected to provide the required level of synchronization. Another case is when the two streams have the same content pipeline. It may be that the timeline segments have the same timestamps, and synching may be relatively easy—but the system 210 does not know a priori that the two streams have the same pipeline.

At least partly to enable synchronization in such cases, a computerized content synchronization system is disclosed herein, with reference to FIGS. 2-3, which comprises a processing circuitry 215. A computerized method is disclosed herein, with reference to FIGS. 5 to 6, which comprises performing at least the following actions by the processing circuitry:

a. obtain, from one or more content delivery systems 250, information indicative of one or more content streams 255 (e.g. the URL of each stream), which are associated with a shared content;

b. provide a plurality of algorithms. Each algorithm is configured to perform at least one of: identify, within the information indicative of the content streams 255, one or more synchronization points between the content streams; calculate a timeline difference(s) between the content streams;

c. responsive to a determination that the content synchronization system 210 does not possess, external to the information indicative of the content streams, information concerning characteristics of the content pipeline architecture of each content stream, which is capable of relating timelines of the content streams, perform the following steps:

i. choose an algorithm, based at least on one or more defined criterion parameters, and on an analysis of the information indicative of the content streams; and ii. run the chosen algorithm to identify the synchronization point(s) and/or to calculate the timeline difference(s).

In some examples, this facilitates the synchronized consumption of the shared content by at least one consumer, wherein the at least one consumer is configured to consume the at least two content streams.

In some examples, the at least one consumer comprises multiple consumers, e.g. multiple user devices. The solution thus this facilitates the synchronized consumption of the shared content by multiple user devices, in a case where each user device is configured to consume a distinct content stream (e.g. associated with a distinct URL).

In some examples, the shared content comprises one or more video contents, one or more audio contents, and/or one or more text contents (e.g. text chat data).

In some non-limiting examples, the defined criterion parameter(s) is associated with algorithm characteristics, e.g. with algorithm performance.

In some examples, the content synch system 210 provides a back-end architecture, which includes a collection of algorithms, which are configured to identify cross-ABR manifest timeline correlations, which facilitate calculation of the manifest timeline delta between the different content URLs, and normalize the room position per URLs according to the calculated delta. Each participant device (see disclosure with reference to FIG. 4) can sync to the relevant normalized position of the URL used by that device, with no special consideration that the content is delivered via multiple URLs.

In some examples, such a method can facilitate synchronization of media across multiple OTT sources.

In some examples, system 210 receives at least a manifest of ABR streams, generated by different content pipelines, and use a dynamic mechanism to find synchronization points between the two or more content streams. The mechanism is dynamic, at least in that the decision, on which algorithm(s) to use to facilitate synchronization, is dependent at least on criterion parameters, e.g. associated with algorithm characteristics, and on the particular situations.

In some examples, the information indicative of the content streams comprises their respective URLs. The system 210 analyzes the content URLs, and learn from them information to help it perform further analysis and choose an algorithm. For example, the URL can include known extensions, e.g. for HLS and DASH protocols. In such a case, the system will pick the relevant parser (e.g. an HLS parser), rather than trying out various parsers to see which one works. In some examples, this information includes an ID of the content, and either URLs or means to generate the URLs. As disclosed further herein, the information indicative the content streams, analyzed by system 210, in some cases also comprises one or more of manifests of ABR content streams, media containers, and content payloads (audio/video codecs such as Advanced Video Coding (AVC) and High Efficiency Video Coding (HEVC), and decoded audio/video frames).

Figure 4:
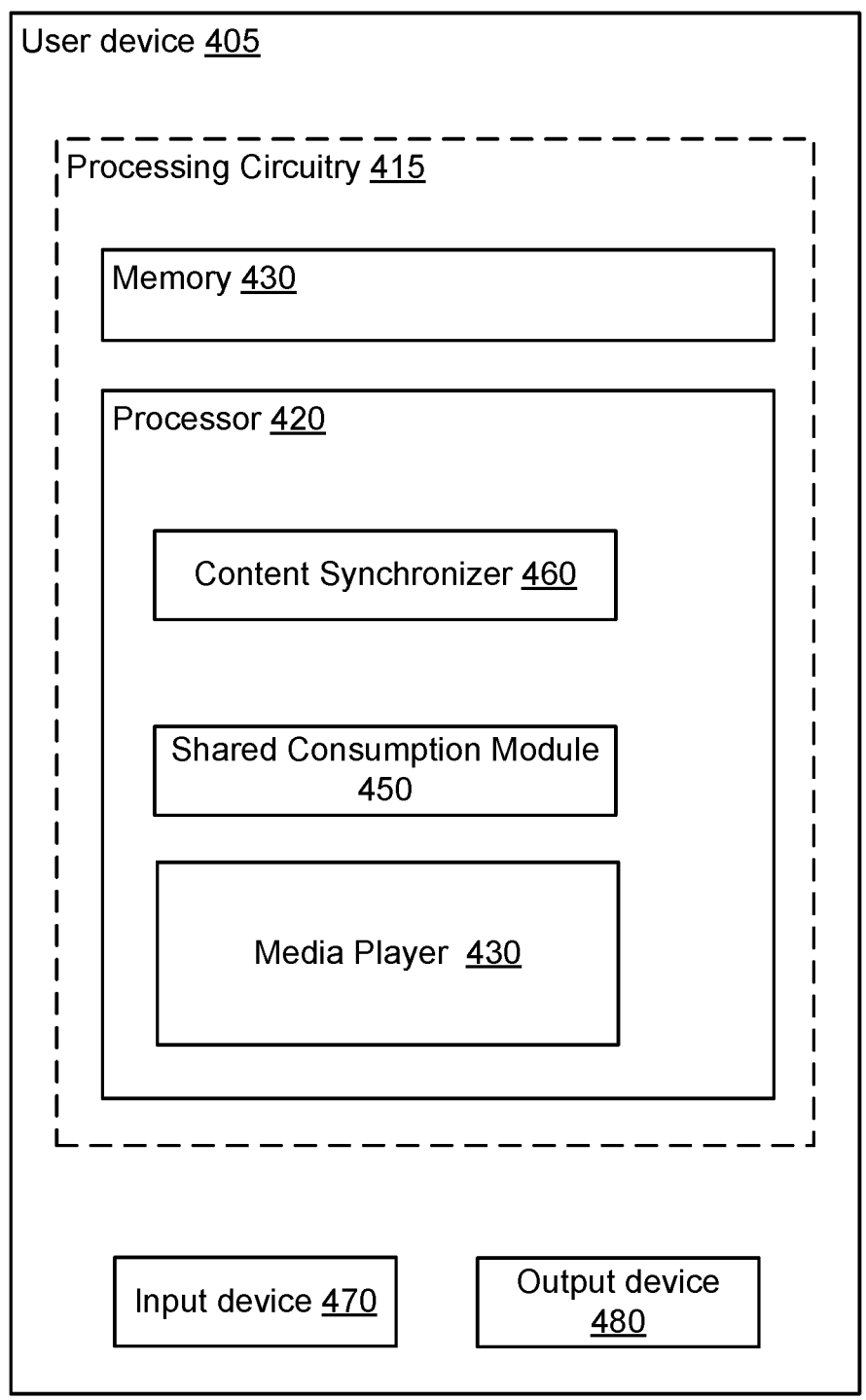
FIG. 4 illustrates schematically an example generalized schematic diagram comprising a user device, in accordance with some embodiments of the presently disclosed subject matter.

After disclosure of example processor 220 modules in FIG. 3, and an example user device 285, 290 in FIG. 4, a general flow of a method is disclosed with reference to FIG. 5. This is followed by one non-limiting example of selection of specific algorithms in a specific order, with reference to FIG. 6. FIG. 7 discloses an example of size correlation, relating to the segment size correlation algorithm disclosed further herein. There are also disclosed, below, example defined criterion parameters, and nonlimiting examples of alternate orders of choice of algorithms to be run.

FIG. 2 also discloses a Digital Rights Management (DRM) system 260. In some examples, system 210 is operatively coupled to, and/or integrated with, one or more DRM systems 260. As will be disclosed further herein, e.g. with reference to FIG. 6, in some examples such access to DRM can affect the choice of algorithms to be run.

Note that the figure shows system 210 as a separate physical system/platform, e.g. a back-end system of a content consumption service (e.g. a shared content consumption service, e.g. performed by the service provider of the shared consumption experience). In some other examples, the functionality can be performed on other systems or devices. An example architecture of user devices such as 280, 285, 290 is disclosed further herein with reference to FIG. 4.

Note also that the content streams are in some examples associated with different media types. For example, the user of user device 280 is watching a video of the game, while the user of user device 285 is listening to an audio-only broadcast of the same game.

In some example cases, the content streams are associated respectively with distinct content pipelines. In some example cases, the content streams are associated respectively with distinct ABR protocols (e.g. HLS vs MPEG-DASH). In one such example, the content streams are associated respectively with a single source camera 110 with different ABR protocol packaging (HLS and MPEG-DASH) In some example cases, the content streams are associated respectively with different physical packager platforms 124, 134 which utilize the same delivery protocol, e.g. HLS, used e.g. for high availability, or with two HLS packagers after a manifest manipulator update. In some example cases, the content streams are associated respectively with different cameras or other content capture devices 110, 112, 114 which are capturing the same event.

Attention is now drawn to FIG. 3, schematically illustrating an example generalized schematic diagram 300 of a processor 220, in accordance with some embodiments of the presently disclosed subject matter. In some non-limiting examples, processor 220 includes one or more functional modules.

In some examples, processor 220 comprises a plurality of algorithms 310, 315, numbered in the FIG. 1 to n. In some examples, each algorithm is configured to identify, within the information indicative of the content streams 255, one or more synchronization points between the content streams 255, and/or to calculate a timeline difference(s) between the content streams.

In some examples, processor 220 comprises algorithm controller module 320. In some examples, this controller is configured to choose an algorithm 310, 315 to run, based at least on one or more defined criterion parameters, and on an analysis of the information indicative of the content streams 255 (which it receives). As disclosed further herein, in some examples the controller 320 is configured to manage the orchestration of algorithms and the matching between algorithms and content. As disclosed further herein, in some examples the controller 320 is configured to create a cascade of algorithms, and to run them in a particular order, until it decides that correlation between the content streams has been found with a sufficient level of confidence, or that correlation and synchronization cannot be achieved.

In some examples, processor 220 optionally comprises stream characteristics learning module 330. In some examples, this module is configured to perform e.g. machine learning on interim and final outputs of each algorithm that is run, and thus to learn past behavior patterns associated with each content stream. For example, it may learn that the stream associated with a particular URL format, or with a particular content source provideroften succeeds using algorithm #3—and thus that algorithm #3 might be a good first choice algorithm the next time that content streams of e.g. this particular content provider are encountered.

More generally, this information can be fed to the algorithm controller 320, and can thus help the controller 320 select the most appropriate algorithm 310, 315 to run the next time a content stream form that particular URL is received. For example, based on the learned behavior patterns, the controller can determine that Algorithm n has a relatively high probability of facilitating a synch of stream timelines, and thus Algorithm n will be places earlier in the order of selection for that URL, or even might be placed as the first to try.

In some such cases, a defined criterion parameter used by the controller 320 can be an indication of past content characteristics associated a particular content stream(s). As indicated above, in some such cases the indication of past content characteristics is derived at least partially using machine learning.

Note that in some examples, machine learning on algorithm inputs and outputs can facilitate building of "a priori"-type knowledge, over time, based purely on information in the content streams, without a parallel out-of-band stream carrying information to help algorithm choice, and without other integration of system 210 with the content pipeline(s).

In some examples, processor 220 optionally comprises input/output (I/O) module 360. In some examples, this module is configured to provide the communications interface 255 with OTT or other content providers 250. In some examples this module is configured to provide the communications interface 270, 275, 279 to end user devices 280, 285, 290. Note that in some other examples, the interface to the CDNs/content providers/content delivery systems, and the interface to the user devices, use separate functional modules.

In some examples, processor 220 optionally comprises content manager module 350. In some examples, this module is configured to interface 255 with OTT or other content providers 250, e.g. via I/O module 360. As disclosed further herein, in some examples this module obtains or receives manifests, media content segments etc., to be analyzed by controller 320 when choosing synchronization algorithms 310, 315. In some examples, this module provides the integration or interface with DRM system 260. In some other implementations, a dedicated module in processor 220 (not shown) provides the DRM interface.

In some examples, processor 220 optionally comprises shared content service module 370. In some examples, this module is configured to interface 270, 275, 279 with end user devices 280, 285, 290, e.g. via I/O module 360. In some examples this interface is used to send synchronization information, e.g. timelines differences (deltas), e.g. between pairs of content streams. In some examples, this module is referred to herein also as synchronization service module 370.

More disclosure on functions of these modules is presented further herein with reference to e.g. FIGS. 5 and 6.

Attention is now drawn to FIG. 4, schematically illustrating an example generalized schematic diagram 400 comprising a user device 405, in accordance with some embodiments of the presently disclosed subject matter. In some non-limiting examples, user device 405 includes a computer. It may, by way of non-limiting example, comprise a processing circuitry 415. This processing circuitry may comprise a processor 420 and a memory 430. In some examples, user device 405 is a personal computer or television set 290. In some examples, user device 405 is a mobile device, e.g. a smartphone, other mobile phone, other phone 280, 285.

The processing circuitry 415 may be, in non-limiting examples, general-purpose computer(s) specially configured for the desired purpose by a computer program stored in a non-transitory computer-readable storage medium. They may be configured to execute several functional modules in accordance with computer-readable instructions. In other non-limiting examples, this processing circuitry 415 may be a computer(s) specially constructed for the desired purposes.

In some examples, processor 420 comprises media player module 430. In some examples, module 430 is configured to receive and play the media content (e.g. audio and/or video) received from content source 250. In some examples, this module also handles Digital Rights Management (DRM) functions.

In some examples, processor 420 comprises shared consumption module 450. In some examples, module 450 is the application for shared viewing/consumption of a content, e.g. in a watching party in a virtual "room".

In some examples, processor 420 comprises content synchronizer 460. In some examples, module 460 controls the media player 430, synchronizing the playing to the shared or common room position, and/or with other devices sharing the consumption. In some examples, module 460 instructs the media player 430 to e.g. seek to a position, play slower/faster or pause.

In some non-limiting examples, the module is a Software Development Kit (SDK) working together with the shared content application/shared consumption module 450. In order to facilitate accurate synchronization, e.g. in a case where user devices in the "room" are consuming multiple distinct content streams (e.g. associated with multiple URLs), the content synchronizer 460 receives, e.g. from the synchronization service 370 of content synchronization system 210, calculated timeline differences, and/or synchronization point information, associated with the multiple content streams (e.g. with URL1, URL2, URL3). In some examples, the content synchronizer 460 receives the normalized room position for the URL in use by the particular device 280, 385.

In some other examples, the content synchronizer 460 receives also the room position from shared content application/shared consumption module 450. In some examples, each SDK 450, of each device 280, 285, 290 in the shared session, looks at its distance from the "room", that is from the shared timeline of the consumption session. After an event such as a seek, or perhaps a network problem, the SDK determines its current position relative the room position, and if this distance is beyond the room's threshold it brings itself back within the threshold.

In some examples user device 405 comprises one or more input devices 470, e.g. a keyboard, touch screen or remote control unit 470.

In some examples user device 405 comprises one or more output devices 480, e.g. a display screen, speakers, earphones or earphone jacks 480.

Note that FIGS. 2-4 illustrate only one exemplary implementation of synchronization of multiple content streams from different content sources. Other implementations are possible.

FIGS. 2-4 illustrate only a general schematic of the system architecture, describing, by way of non-limiting example, certain aspects of the presently disclosed subject matter in an informative manner, merely for clarity of explanation. It will be understood that the teachings of the presently disclosed subject matter are not bound by what is described with reference to FIGS. 2-4.

Only certain components are shown, as needed, to exemplify the presently disclosed subject matter. Other components and sub-components, not shown, may exist. Systems such as those described with respect to the non-limiting examples of FIGS. 2-4 may be capable of performing all, some, or part of the methods disclosed herein.

Each system component and module in FIGS. 2-4 can be made up of any combination of software, hardware and/or firmware, as relevant, executed on a suitable device or devices, which perform the functions as defined and explained herein. The hardware can be digital and/or analog. Equivalent and/or modified functionality, as described with respect to each system component and module, can be consolidated or divided in another manner. Thus, in some embodiments of the presently disclosed subject matter, the system may include fewer, more, modified and/or different components, modules and functions than those shown in FIGS. 2-4. To provide one non-limiting example of this, there can be separate I/O interface modules 360 for the content source interface and for the user device interface.

One or more of these components and modules can be centralized in one location, or dispersed and distributed over more than one location, as is relevant. In some examples, certain components utilize a cloud implementation, e.g. implemented in a private or public cloud.

Each component in FIGS. 2-4 may represent a plurality of the particular component, possibly in a distributed architecture, which are adapted to independently and/or cooperatively operate to process various data and electrical inputs, and for enabling operations related to a computerized hearing test. In some cases, multiple instances of a component may be utilized for reasons of performance, redundancy and/or availability. Similarly, in some cases, multiple instances of a component may be utilized for reasons of functionality or application. For example, different portions of the particular functionality may be placed in different instances of the component.

Communication between the various components of the systems of FIGS. 2-4, in cases where they are not located entirely in one location or in one physical component, can be realized by any signaling system or communication components, modules, protocols, software languages and drive signals, and can be wired and/or wireless, as appropriate. The same applies to interfaces such as modules 360.

Figure 5A:
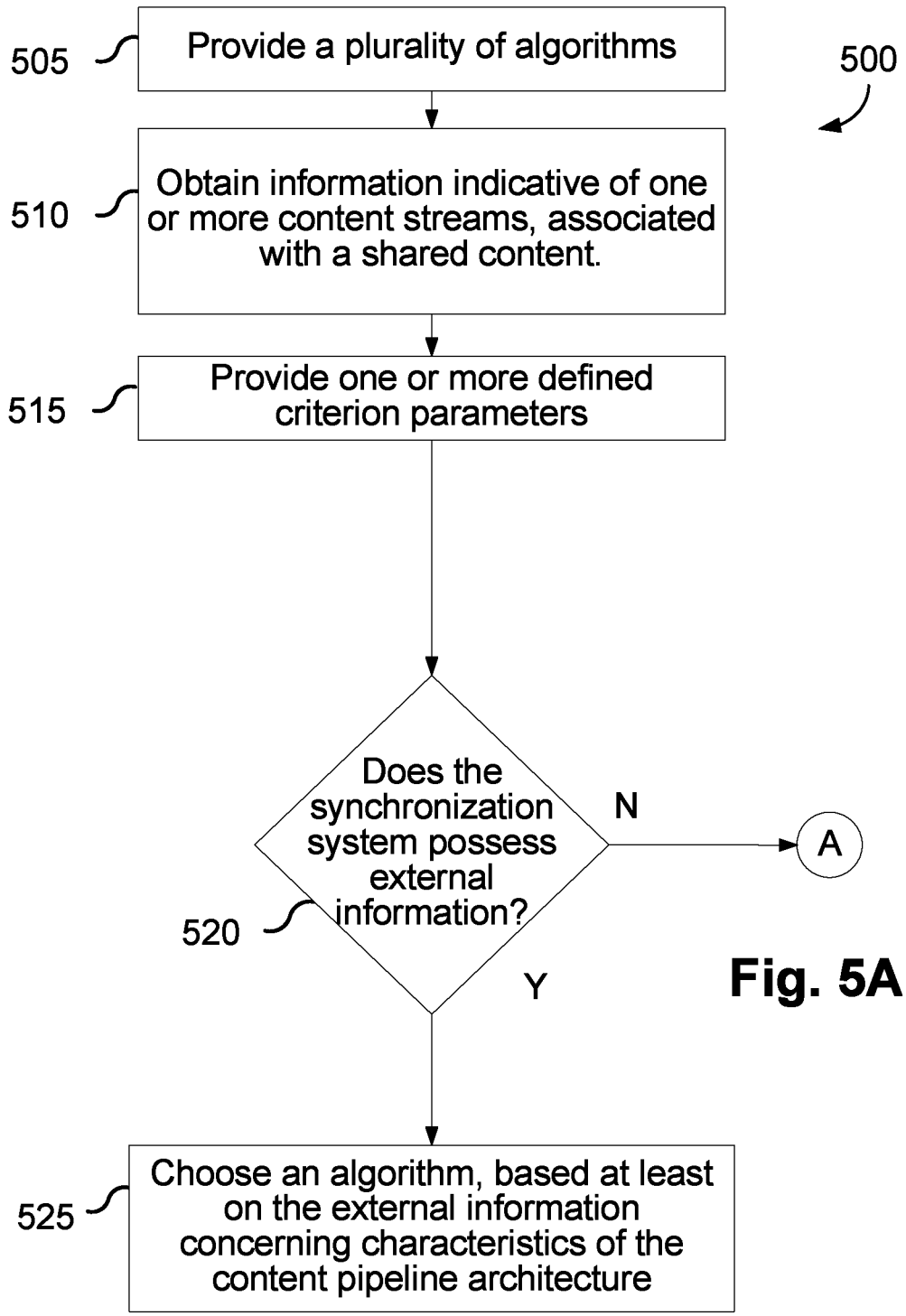
FIGS. 5A-5C illustrate schematically an example generalized schematic diagram of a flow of a process or method, for synchronization of content streams, in accordance with some embodiments of the presently disclosed subject matter.
Figure 5B:
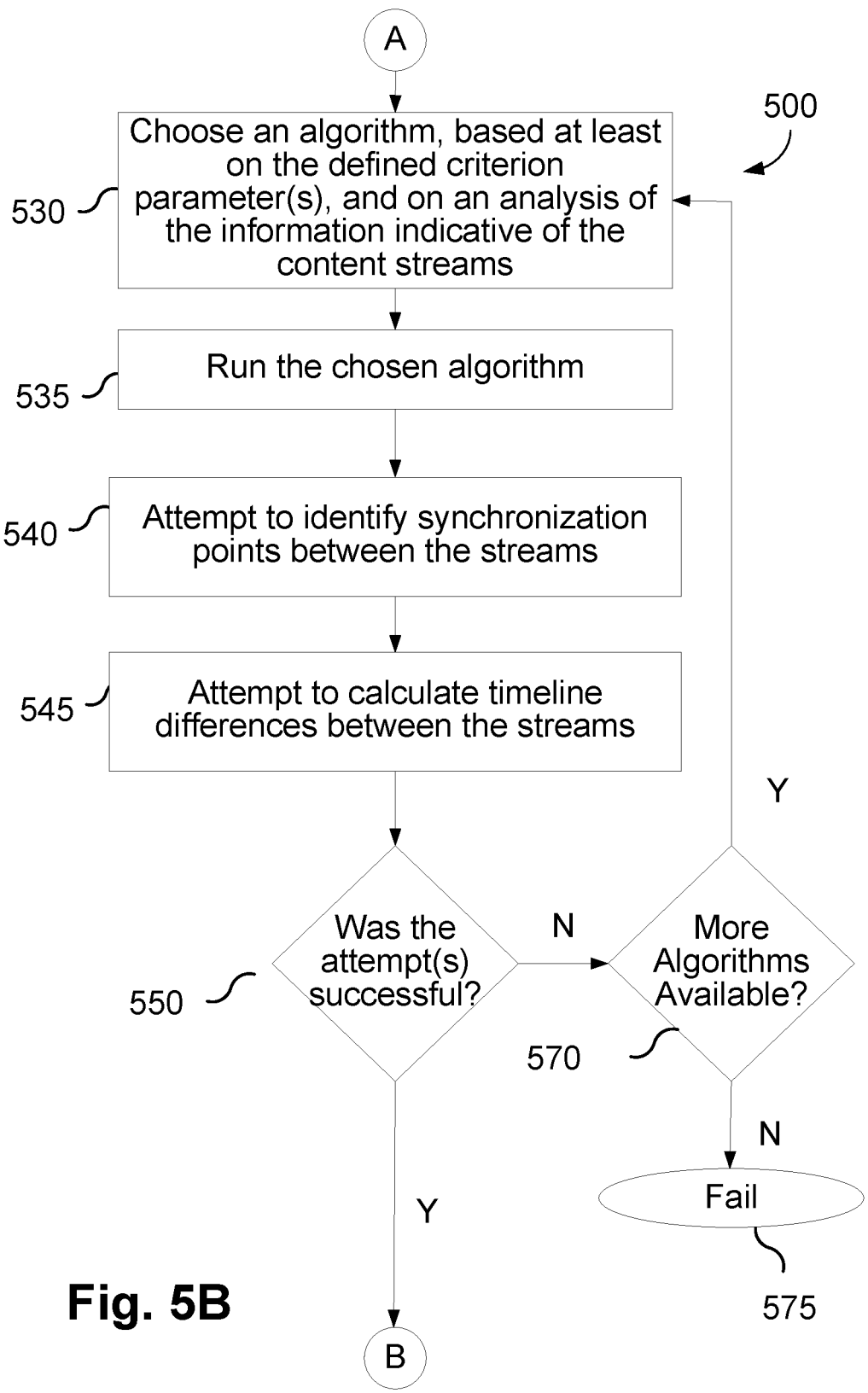
Figure 5C:
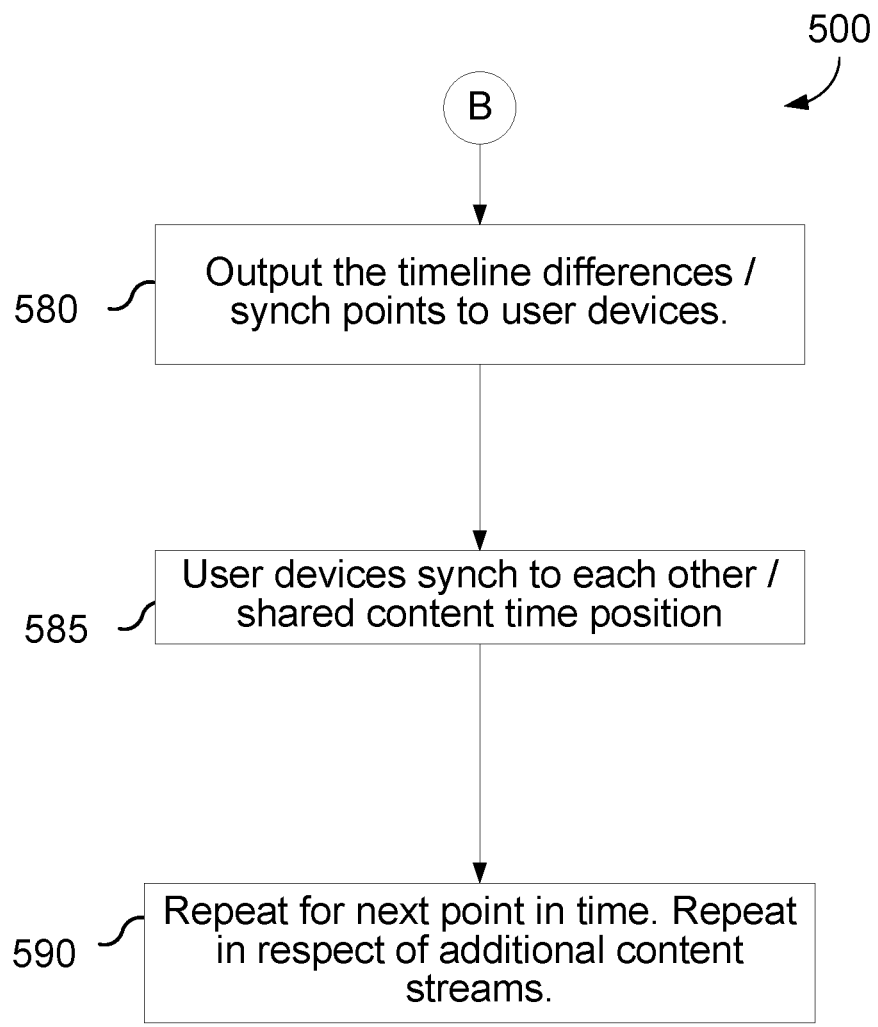

Attention is drawn to FIGS. 5A-5C, schematically illustrating a generalized flow chart diagram, of a flow 500 of a process or method, for synchronization of content streams, in accordance with some embodiments of the presently disclosed subject matter. This process is, in some examples, carried out by systems such as those disclosed with reference to FIGS. 2-4. The flow starts at 505, in FIG. 5A.

According to some examples, a plurality of algorithms 310, 315 are provided to the system 210 (block 505). In some examples, each such algorithm is configured to identify, within the information indicative of the content streams, one or more synchronization points between the content streams, to calculate a timeline difference between the content streams, or to perform both.

According to some examples, information indicative of at least two content streams is obtained (block 510). In some examples, this information is obtained from one or more content delivery systems 250, e.g. those disclosed with reference to FIG. 1. The two or more content streams are associated with a shared content, comprising at least one of a video content and an audio content. In some examples, this is performed by content synch system 210, e.g. using content manager 350 and I/O module 360 of processor 220.

In some examples several this obtained information will be available as an input to the algorithm that will be chosen, e.g. in steps 525 or 530. In some examples, content is downloaded as it is available—e.g. as the system starts downloading a Video on Demand (VOD) stream. For e.g. a live stream, the download this information is in some cases downloaded continually, since time windows are continually moving.

In one example, if a specific algorithm needs ten (10) segments downloaded to run its calculation, they may be all available in the case of VOD, but in a live stream the algorithm might have to wait for the ten segments to be available.

For example, the content manager 350 downloads manifests, audio/video container headers, and payload segments of video/audio payloads, as needed by the relevant algorithms. These items of information are inputs to the process.

In some other examples, the algorithms themselves download the manifests and other content stream information, as is needed.

According to some examples, one or more defined criterion parameters are provided, to synch system 210 (block 515). Non-limiting example parameters, e.g. criteria parameters associated with algorithm characteristics such as performance, are disclosed further herein.

According to some examples, a determination is made, whether or not the computerized content synchronization system 210 possesses, external to the information indicative of at least two content streams 255, information concerning characteristics of a content pipeline architecture of each content stream (block 520). In some examples, this information is capable of relating timelines of the multiple content streams. In some examples, this is performed by algorithm controller 320. For example, the system determines that it has a lack of a priori information capable of relating timelines of the multiple content streams.

According to some examples, responsive to a determination that the computerized content synchronization system does possess such external information, an algorithm is chosen, based at least on the external information concerning characteristics of the content pipeline architecture (block 525). In some examples, this is performed by algorithm controller 320. Examples of this block are disclosed further herein.

In some other examples, in block 525 the following can occur instead: the time difference can be calculated without the need to run an algorithm. For example, if the provided external information is that timeline is aligned, the system 210 can set the time difference to zero. Note that this case is not shown in the figure.

In some examples, the algorithm chosen in this block functions as a first-choice algorithm. In some examples (not shown in the flow chart), the blocks 535-550 of FIG. 5B are performed.

In some examples, if the attempt using this chosen algorithm is not successful at block 550, in some implementations blocks 570 and 530 are performed to select a next algorithm.

In some other example implementations, block 525 is repeated, choosing another algorithm, again based at least on the external information.

According to some examples, responsive to a determination that the computerized content synchronization system does not possess such external information, flow continues A to FIG. 5B, to block 530. According to some examples, an algorithm is chosen, based at least on the defined criterion parameter(s), and on an analysis of the information indicative of the content streams 255 (block 530). In some examples, this is performed by algorithm controller 320. One example of a defined criterion parameter is a complexity criterion, choosing preferentially algorithms of lower complexity, e.g. algorithms requiring lower processor utilization.

In some examples, the choosing of an algorithm comprises choosing a set of candidate algorithms, within the plurality of algorithms. For example, if there are four algorithms A to D, the analysis of the content streams, in light of the criterion parameter(s), may result in ruling out algorithms A and C from being candidates, and deciding that B and D are candidate algorithms, from which the algorithm to utilize should be chosen.

In some examples, the choosing of an algorithm comprises performing an incremental algorithm selection. That is, the first algorithm that is chosen functions as first-choice algorithm. If, at block 550 (disclosed below), the first chosen algorithm does not succeed in identifying synchronization point(s), or in calculating timeline difference(s), a next-choice algorithm is chosen and run. In some examples, such an algorithm selection is performed at least partly in a pre-defined order, the pre-defined order being based at least on defined criterion parameter(s).

Considering the example disclosed above, in some examples there is a pre-defined order of choice, e.g. B, A, C, D. In some other examples, candidates are first selected, and then an incremental algorithm selection is performed. For example, algorithms A and C are ruled out, i.e. are eliminated as possible candidates, and then B is chosen as a first choice, from among the remaining candidate algorithms B and D. If running B does not succeed in synching the content streams among themselves, algorithm D will be chosen as the next-choice algorithm.

Note the choice is in some examples based on the content provider. That is, for the content provider I, it can be that A & C are ruled out, while for content provider II A and B are ruled out.

According to some examples, the chosen algorithm 310, 315 is run (block 535).

According to some examples, the algorithm that is run attempts to identify synchronization points between the streams (block 540). In some examples, these are ABR streams. In some examples, these are push streams. In some other examples, these are a combination of ABR and push streams. In some examples, stream characteristics learning module 330 is also run, to learn information about the performance of the run, and about the inputs and outputs.

According to some examples, the algorithm that is run attempts to calculate timeline differences between the streams (block 545). In some examples, a particular algorithm performs one of blocks 540 and 545. In some examples, a particular algorithm performs both of blocks 540 and 545. In some other examples, an algorithm performs one of blocks 540 and 545, and another module such as algorithm controller 320 performs the other block.

According to some examples, a determination is made, whether or not the attempt(s) in blocks 540 and/or 545 were successful (block 550). In some examples, this is performed by algorithm controller 320.

According to some examples, responsive to a determination that the attempt(s) in blocks 540 and/or 545 were not successful, a determination is made whether other algorithms (e.g. selected candidate algorithms) are available to be tried (block 570). In some examples, this is performed by algorithm controller 320.

According to some examples, responsive to a determination that other algorithms are available to be tried, the flow reverts to block 530. Another algorithm is chosen, e.g. from the determined list of candidate algorithms. For example, a next-choice algorithm is chosen. As disclosed above, in some examples the choice is made at least partly based on a pre-defined order.

According to some examples, responsive to a determination no other algorithms are available to be tried, the flow proceeds to block 575. The synchronization of the multiple content streams is determined to have failed.

According to some examples, responsive to a determination at block 550 that the attempt(s) in blocks 540 and/or 545 were successful, flow proceeds B to block 580 in FIG. 5C. According to some examples, the calculated timeline differences, and/or the identified synchronization points, are output (block 580). In some examples, this is performed by synchronization service module 370 of processor 220, using I/O module 360. In some examples, the output is to consumer systems. One example of consumer systems is user devices 280, 285, 290. Another example of consumer systems is a service that runs on a backend system, e.g. another service comprised in system 210, or a service not comprised in system 210.

Considering the non-limiting example of a shared virtual room, in which the user devices are synchronized to a common content time position, referred to herein also as a room position, in some example the system 210 (e.g. utilizing synch service 370) selects one of the time positions, associated with one of the content streams, and sets that selected position to constitute the common content time position (room position). This selected time position is referred to herein also as a second time position. In some examples, a time difference between another content stream and this second time position (e.g. a time difference associated with the two URLs) is determined. A content-stream-specific common content time position, associated with this other stream, is determined based at least on the common content position and the determined time difference. That is, the room position is normalized, per content stream, based on the time differences between streams.

Note that in some examples, the selection of the second time position is based on the second time position being associated with a maximum time delay, from a time associated with generation, preparation and/or transmission of the shared content. For example, if the football game is held and recorded in England, and two content streams are associated with two head ends, one in England and one in California, it may be that the content stream originating in California may have a certain delay compared to that originating in England. In one example, it can be that a particular segment is published in the California head end later than it is published in the English head end. End user 280 receives content from the California head end, and end user 285 receives content from the English head end. There is a delay between when the two users receive the content which is packaged and then published in the two manifests. In some such cases, it may be advantageous to select the time position associated with the California content stream to be the second time position, and thus the common content time position. This will ensure that the lower-delay England content stream will already have the relevant media frames, and that this stream will be able to successfully synch to the selected common content time position.

In some other examples, the common content time position is not that of any of the content streams. In some such cases, a time difference between a particular content stream and the common content position is determined. This time difference is referred to herein also as a second time difference. A content-stream-specific common content position, to which user devices consuming that particular content stream will synch, can be determined, based at least on the common content position and the determined time difference. This process can be performed for each of the content streams. According to some examples, the user devices synchronize to each other, and/or to respective content-stream-specific common content time position(s), in the shared content, such as a shared room position, e.g. a content-stream-specific common content position (block 580).

According to some examples, the process of FIG. 5 is repeated, one or more times, for one or more others points in time associated with the multiple content streams (block 590). For example, the system 210 can continually monitoring the content streams, looking for changes in the relevant information, and updating common content position(s) based the changes that are discovered.

For example, the content streams 255 can get out of synch, e.g. due to network problems, or a component such as a packager re-starts, or it did not send certain segments, or the system re-buffers. As another example, the system may notice e.g. a discontinuity in the manifest, or similar event which requires calculating the time difference again, and the algorithm must be run again. Thus, in some cases, the system 210 looks at the manifests, and sees that the earlier synchronization calculations are no longer valid.

In another example, something occurs, which requires recalculating, per content stream, the room position. As on example of this, a user device 285 is "seeking" the common room to a new position.

In some examples, the algorithm chosen, in a second or later performance of blocks 525 and/or or 530, differs from the particular algorithm chosen, in an earlier, or a first, performance of blocks 525 and/or or 530. For example, as more content is received and analyzed in the streams, the chosen algorithms can be changed. These chosen algorithms are referred to herein, respectively, also a second algorithm and a first algorithm. That is, it is not always the case that one particular algorithm is used to repeatedly perform synchronization throughout the consumption of a particular content, e.g. a particular film.

Also within block 590, in some examples the synchronization system 210 obtains information indicative of an additional content stream, which is associated with the same shared content. As one example, it is indicated that a new stream is available for the particular content. For example, an additional camera or microphone is now used to capture the football game. In some cases, responsive to this, this additional content stream is considered in the synchronization process. That is, the multiple content streams to be synchronized will now comprise the additional content stream. The repetition of block 590 will, in such a case, will be performed for the additional content stream as well. Thus, the system can be configured to support dynamically adding of content streams, and to automatically perform timeline difference calculations also for the added stream.

Figure 6A:
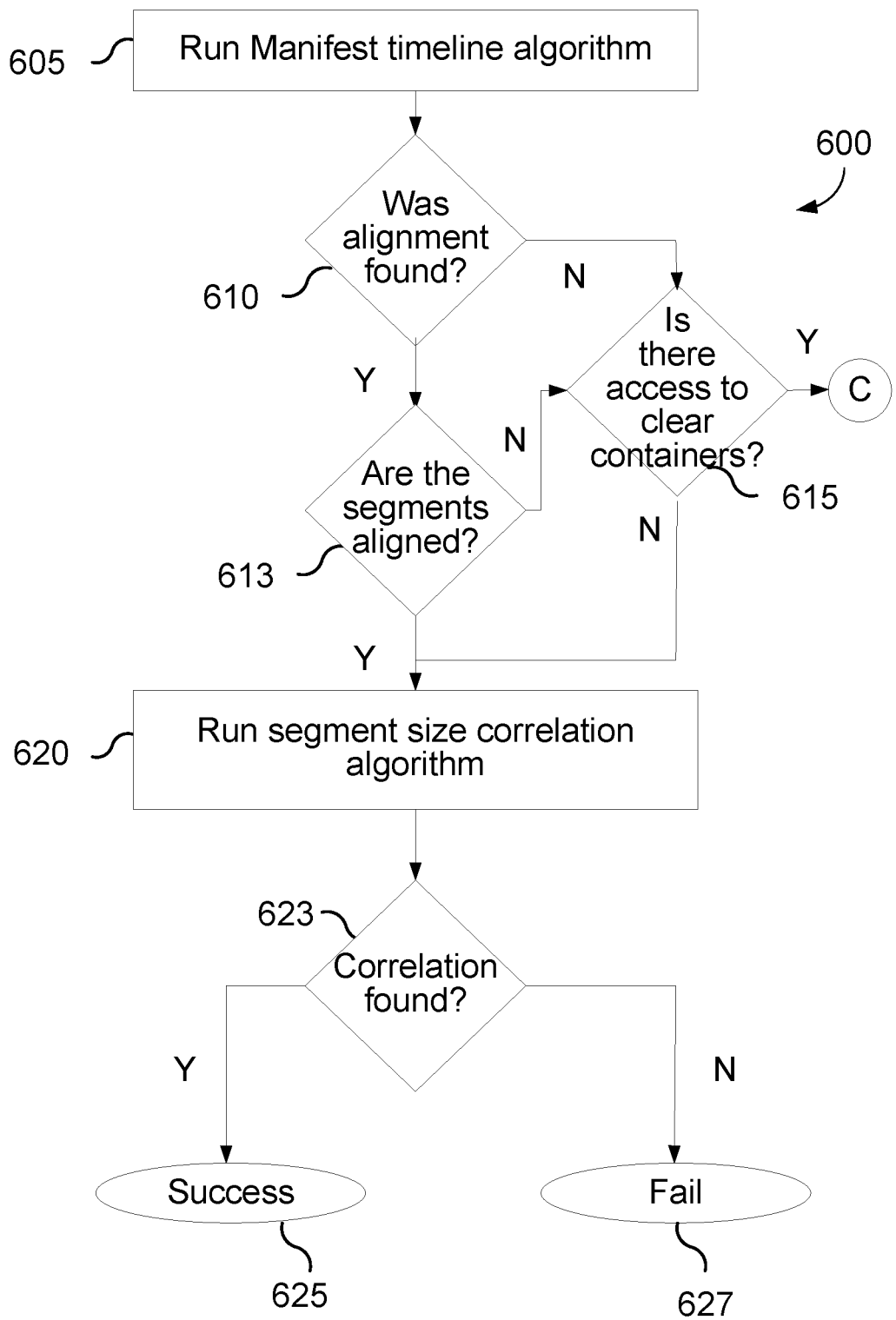
FIGS. 6A-6C illustrate schematically an example generalized schematic diagram of a flow of a process or method, for synchronization of content streams, in accordance with some embodiments of the presently disclosed subject matter.
Figure 6B:
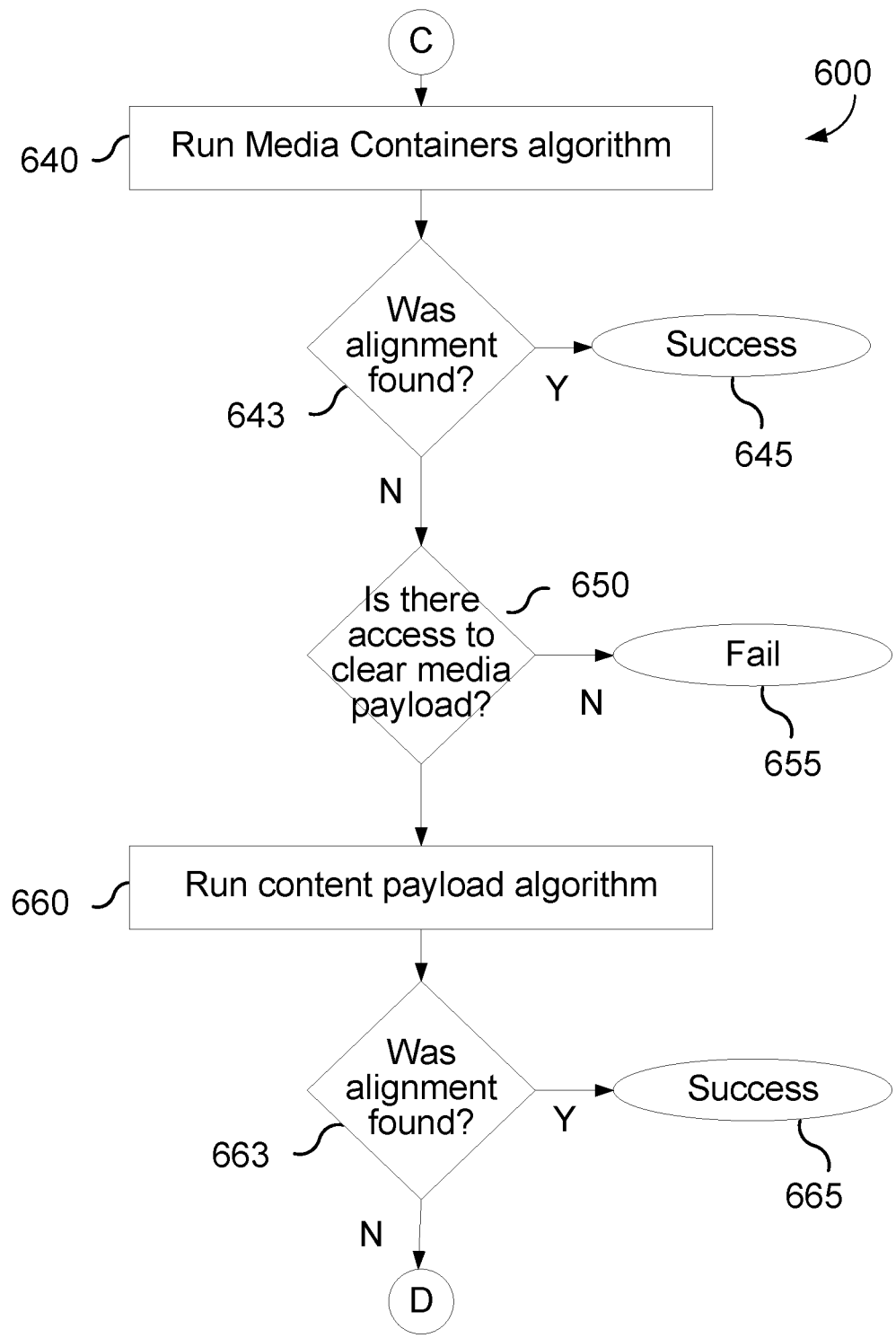
Figure 6C:
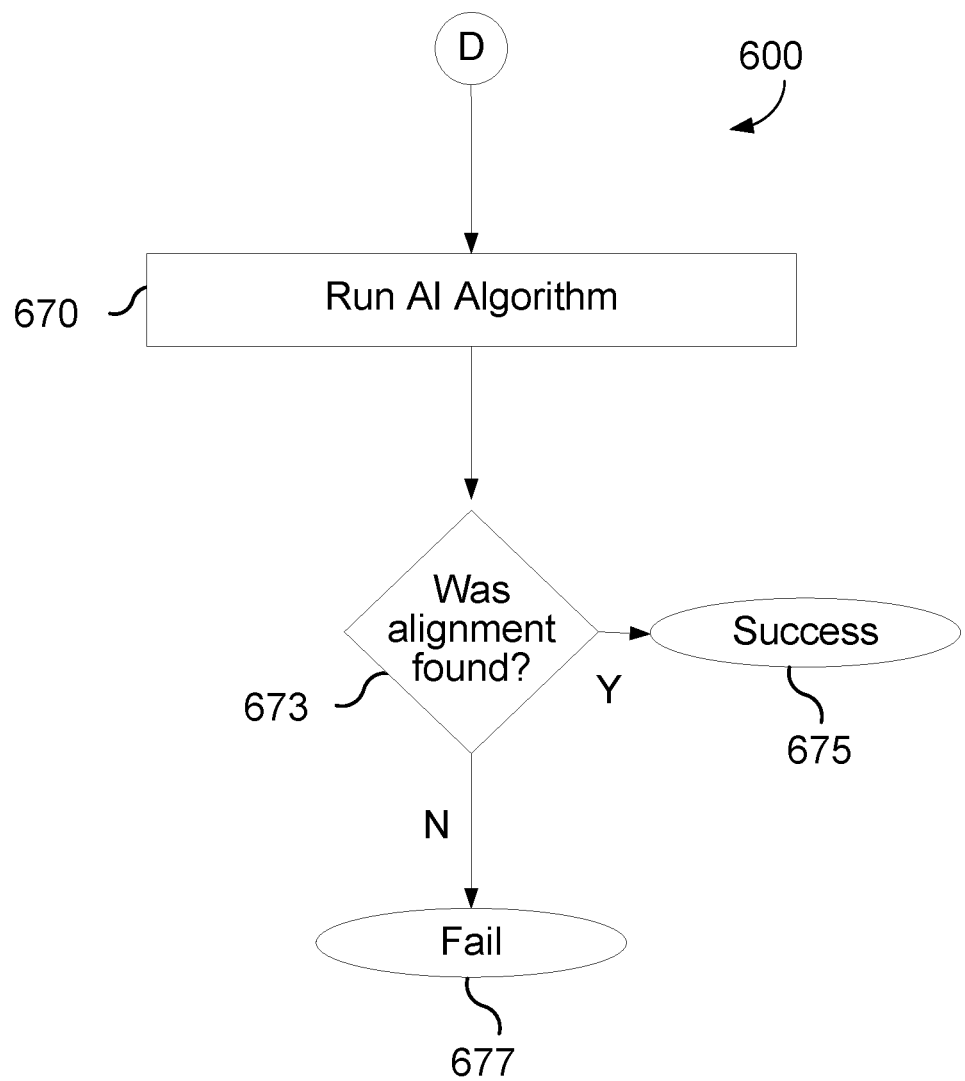
Figure 7:
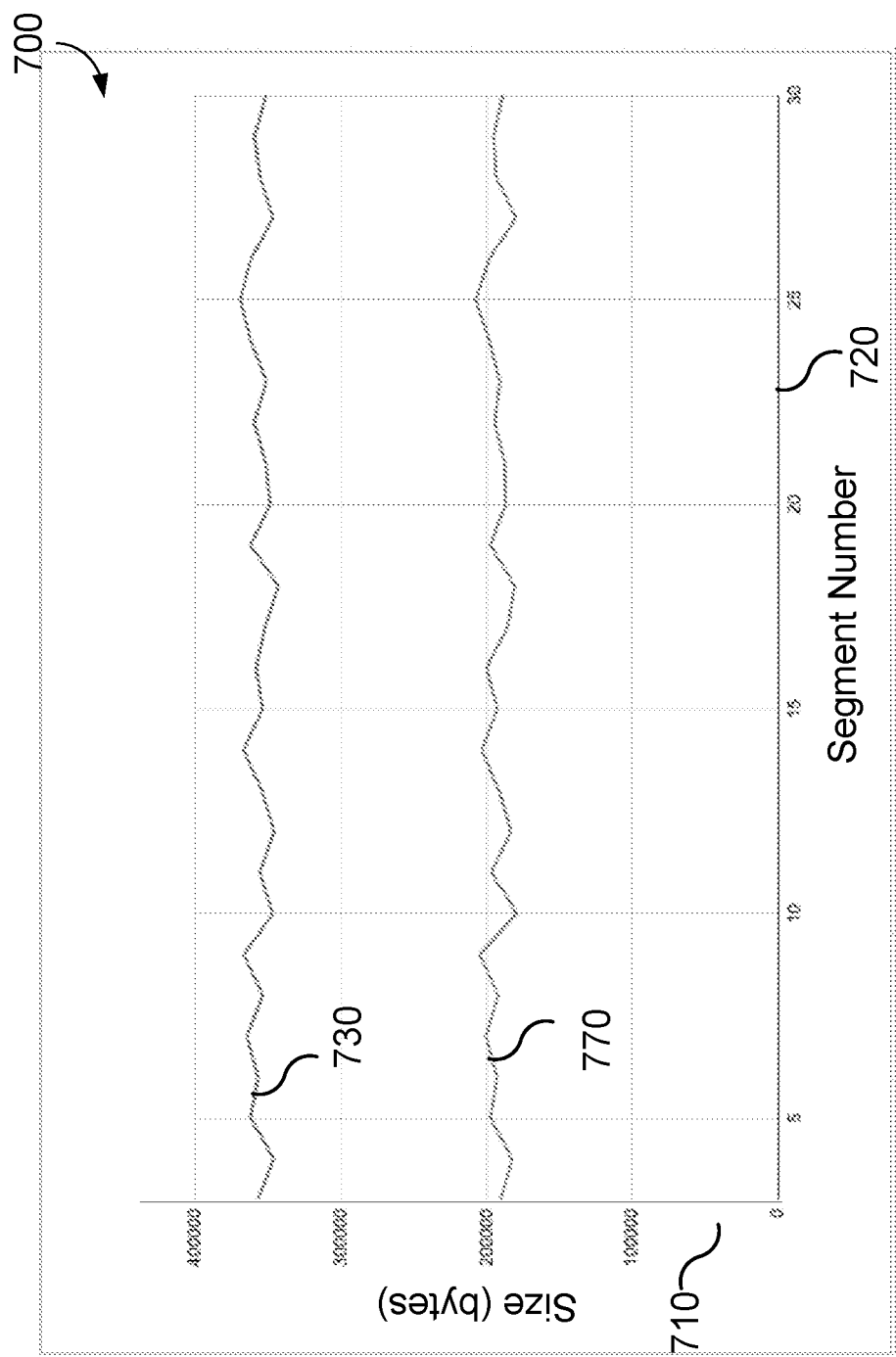
FIG. 7 schematically illustrates one example generalized diagram, of segment size correlation, in accordance with some embodiments of the presently disclosed subject matter.

Attention is drawn to FIGS. 6A-6C, schematically illustrating a generalized flow chart diagram, of a flow 600 of a process or method, for synchronization of content streams, in accordance with some embodiments of the presently disclosed subject matter. These figures disclose one non-limiting example of a specific process for choosing and running algorithms, using specific algorithms in a specific order. As disclosed further herein, alternative implementations are possible.

This process is, in some examples, carried out by systems such as those disclosed with reference to FIGS. 2-4. In some examples, the flow 600 is a detailed example of the process disclosed with reference to FIG. 5B.

The flow starts at 605, in FIG. 6A. According to some examples, a manifest timeline algorithm, which is one of the plurality of algorithms 310, 315, is chosen and run (block 605). In some examples, the information indicative of the two or more content streams 255, which was download/received by the content synchronization system 210, comprises a manifest. In such a case, the analysis of the information indicative of the content streams comprises an analysis of timeline information comprised in the manifest, attempting to synchronize between the manifests. In some examples, the manifest comprises, in addition to the URL for the particular content stream, bit rates/quality levels available for the content stream, and information on content segments, for each bit rate (e.g. segment identification, start time and time length of segment). In some examples, the manifest timeline algorithm is configured to identify an at least partial overlap of respective manifest timelines in respective manifests associated with the at least two content streams.

Thus, in some examples, the information indicative of the content streams comprises manifests, and the analysis of this information comprises an analysis of timeline information comprised in the manifest. In some examples, this comprises the segment boundary times, e.g. timestamps, e.g. start times, associated with content stream. In some examples, it is advantageous that there is overlap in a window large enough to encapsulate the maximum delay between streams. Thus, in the example disclosed with reference to content streams originating in California and London, assuming the delay can be 10 seconds maximum, it can be advantageous to look at overlap in a window larger than that.

For example, the respective manifests associated with URL 1 and URL 2 are compared. The absolute times of content segments listed in the two manifests are compared. The manifest 1 of URL1 covers times of 27/10/2021 06:30-06:40, and the manifest 2 of URL2 covers times of 27/10/2021 06:32-06:43. It is determined that the time intervals represented by the two manifests overlap. If, for example, the manifest of URL1 covers times of 27/10/2021 06:30-06:40, and the manifest of URL2 covers times of 27/10/2021 06:50-06:53, the manifest timelines do not overlap.

In block 610, a determination is made, whether such alignment of manifest timelines was found.

In some examples, in response to a determination that such alignment was found, i.e. in response to the identifying of the overlap, the manifest timeline algorithm is further configured to identify a successive sequence of segments, of a configured sequence length, that corresponds to same segment times (block 613).

For example, the algorithm determines if a configured number of consecutive segments in the two manifests start (or end) at the same absolute time. That is, at segment boundaries in the two manifests we see the same segment timestamp. For example, in HLS, the algorithm finds in the two manifests segments with identical values of #EXT-X-PROGRAM-DATE-TIME:2. As another example, in MPEG-DASH, a calculation is made of: MpdTime=@availabilityStartTime (converted to seconds)+Period@start+(SampleTime−@presentationTimeOffset)/@timescale.

For example, the algorithm determines that, for a set of 100 successive segments, a first segment time stamp in manifest 1 matches a second segment time stamp in manifest 2. In such a case, where there is correspondence over a sufficiently (configured) large number of segments there is a match, there is a comparatively high probability that the corresponding segments in the two manifests are for identical points in time of the content, e.g. they both represent the kicking of the goal. In some examples, this behavior is preferable to e.g. looking for a match of segment time stamps for only one or two segments.

It should be noted that this optional criterion, of determining that the run of a particular algorithm is declared successful only if that algorithm identifies matching points in a configured number of consecutive segments, in some examples applies not only to the manifest timeline algorithm. As non-limited examples, in some implementations a criterion similar to the above applies also to the content payload algorithm, and/or to the AI algorithm, disclosed further herein. Thus, more generally, in some examples a chosen algorithm is further configured, in response to identifying the synch point(s) and/or calculating the timeline difference, to identify a successive sequence of segments of a configured length in synchronization points are identified and/or the timeline difference is calculated. Responsive to identifying the successive sequence, the chosen algorithm is, in some examples, further configured to perform, based on the successive sequence, the identification of the at least at least one synchronization point and/or the timeline difference calculation Responsive to identifying the successive sequences and determining that the segments are aligned (determination at block 613), the manifest timeline algorithm is in some examples further configured to identify the synchronization point(s) based on the successive sequence. In some cases, it returns these points to algorithm controller 320, or alternatively calculates the timeline difference. In such examples, it is determined that there is a low probability that the streams represented by the two manifests do NOT correlate, and thus it can be determined that the process has succeeded. Absolute timelines of the segments described by the manifests have been determined.

One example user case of this is where the same packager sent both manifests, or in a case of Encoder Boundary Point (EBP) based packaging.

In some examples, e.g. as illustrated in the figure, in response to a successful determination at block 613, optionally an additional algorithm is run to validate the determination that the two manifests have been correlated, that is to increase the probability that the two content streams have been in fact aligned. In such an example, a segment size correlation algorithm is chosen and run (block 620). In some examples, the information indicative of the content streams comprises a plurality of segment sizes, which are e.g. downloaded. For example, segment 101 is 2 megabyte (MB), segment 102 is 1.8 MB etc. In some examples, this segment size correlation algorithm configured to calculate correlation between successive segment sizes of respective content segments of the content streams over time. This is illustrated schematically in FIG. 7.

Attention is drawn to FIG. 7, schematically illustrating an example generalized diagram, of segment size correlation, in accordance with some embodiments of the presently disclosed subject matter. The chart 700 graphs segment numbers (X-axis 720) against segment sizes, e.g. in bytes (Y-axis 710). In the example, plot 730 represents a content stream in HLS protocol, while plot 770 represents a content stream corresponding to the same content, but in DASH protocol. The algorithm looks for patterns of the content size over time, in the streams for the two URLs. It checks whether there is a correlation, over time, of increased and decreased size, e.g. both plots change in the same direction, over time. For example, in both the size increases and then decreases in a similar time interval in both streams.

In some examples the content sizes of the segments are determined by looking at size parameters in e.g. HTTP headers or the manifest, and/or looking at the sizes of the content segments themselves within the content streams.

In some non-limiting examples, the segment size correlation algorithm utilizes Pearson's Correlation Coefficient (PCC).

Reverting to FIG. 6A, responsive to finding a correlation based on the calculated level or degree of correlation (i.e. is "sufficiently" correlated, per a defined requirement), the segment size correlation algorithm is further configured to identify the synchronization point(s), based on correlated segments of the content streams over time, and/or to calculate the time differences between the streams. For example, differences in the segment timelines are calculated. More generally, in some examples, time differences between the streams comprise a manifest timeline difference.

In some examples, the finding of the correlation comprises the calculated correlation level being above a predefined correlation score, e.g. above 0.5.

One or more points in time (corresponding to segments) in the two streams that correlate are matched. There is a high probability that those matching points are associated with the same time within the content. So this algorithm in some examples provides a probabilistic estimation of the synchronization and/or of the time difference between content streams.

One non-limiting use case where this algorithm works is where there is a single encoder, but different packagers (of different protocols, e.g. HLS vs DASH) were used. The video is the same and the segmentation is the same, although packaged differently. For example, the HLS stream will use a MPEG2 Transport stream container, and the DASH stream will use a fmp4 container. The transcoders for the two streams can be the same, or different. In such a case, segment sizes of the packaged video are different, but trends/patterns over time can be similar. Also, segment duration in the two manifests can be the same. Note, that if there is a correlation, it should exist at all bit rates. Therefore, in one implementation, we first run this algorithm for the lower or lowest bit rate stream listed in the manifest. This can in some cases require comparatively lower processing time and network utilization. Note that this choice of running the algorithm for low bit rate streams of the content is applicable, in general, also to other algorithms (e.g. the example algorithms disclosed herein), for performance reasons.

A determination is made whether a correlation between the two streams has been found by the segment size correlation algorithm (block 623). In response to a determination that a correlation between the two streams has been found, the alignment and synching process is considered a success (block 625). By "success" it is meant that an algorithm 310, 315, and/or the algorithm controller 320, succeeds in identifying synch points in the two or more timelines (e.g. manifest timelines), and/or succeeds in calculating timelines differences between the two or more timelines. The process can stop here.

In response to a determination that a correlation between the two streams has not been found, the alignment and synching process is in some examples considered a failure (block 627). Some, or all, of the multiple content streams associated with the shared content cannot by aligned. In some other examples, not shown in the figure, the flow could instead proceed to blocks 615 and/or 650, attempting to choose and run other algorithms in an attempt to synchronize the content streams.

Reverting to block 610, responsive to a determination that overlap/alignment of manifest timelines was not found, in some examples the flow continues to block 615. Similarly, reverting to block 613, responsive to a determination that a defined number of successive sequences of segments which align cannot be found, in some examples the flow continues to block 615. In other examples, responsive to a determination in block 613 that a defined number of successive sequences of segments which align cannot be found, the process can continue to block 620, running the correlation algorithm.

A determination is made whether the system 210 has access to clear media containers in the content streams (block 615). In some examples this is performed by algorithm controller 320. In any cases, the information indicative of the content streams comprises one or more media containers. In some examples, the media container(s) comprise a video container and/or an audio container.

For example, a determination is made whether there is access to clear video container headers. This can occur, for example, in a case in which the container headers are not unencrypted, and/or are not protected by DRM, or, alternatively, in a case in which they are encrypted, but the system 210 has integration with DRM system 260. Thus, in some cases the analysis of the information indicative of the content streams indicates that at least one content stream of is protected using (DRM).

Responsive to a determination at 615 that the synch system 210 does not have access to clear media containers in the content streams, in some examples flow proceeds to block 620, and the segment size correlation algorithm is run. Note that if there is some overlap between manifest timelines, but sufficient timeline segments are not fully aligned, in some examples the segment size correlation algorithm will not find correlation.

Responsive to a determination at 615 that the synch system 210 does have access to clear media containers in the content streams, in some examples flow proceeds C to block 640 in FIG. 6B, attempting to choose other algorithms. In some other implementations (in an order not illustrated in the figure), the flow can instead first try the segment size correlation algorithm, and only then proceed to block 640 if needed.

Thus, in some examples, analysis of the information indicative of the content streams comprises a determination that media container(s) is readable by the computerized content synchronization system 210.

According to some examples, a media containers algorithm is chosen and run (block 640). In some examples, each content stream comprises respective media containers. Examples of media containers are video containers and audio containers. Example video containers include MPEG-TS, MP4 and FMP4.

The respective media containers comprise corresponding decode times and presentation times (PTS and DTS) associated with each frame. Decode time refers to the time to send the frame to the decode buffer, to allow that frame to be decoded in sufficient time to be presented.

In some examples, analysis of the information indicative of the at least two content streams, performed by the media containers algorithm, comprises an analysis of the corresponding decode times. The media containers algorithm is further configured to compare, within the container headers, decode times, e.g. packager source video decode times such as DTS on MPEG2-TS and TFDT on FMP4, of sequences of media frames in the two URLs/content streams. The algorithm is configured identify one or more identical decode times in respective media containers of at least some respective content segments of the plurality of content streams.

In some examples, responsive to identifying the identical decode time(s), the media container algorithm is further configured to identify synchronization point(s), based on the least one identical decode time, and/or to calculate the time differences between streams. If the decode times are the same, there is a high probability that those matching sequence frames are aligned with each other, that is that the sequence is aligned. Thus, synchronization points can be identified. The corresponding timestamps in the manifest can be used to determine the time difference between the two content streams.

An example use case, for which the media containers algorithm can synch the content streams, is where the content pipelines have a single encoder, or time synched encoders, with two head-ends generating HLS for high availability, where each head end has a transcoder that does not restamp DTS/PTS and packager.

According to some examples, a determination is made whether alignment of the content streams was found by the media containers algorithm (block 643). In some cases, this is performed by the algorithm controller 320. For example, a determination is made whether identical decode times were found.

According to some examples, responsive to a determination at block 643 that alignment of the content streams was found by the media containers algorithm, flow proceeds to block 645. The process succeeded, e.g. in the sense disclosed with reference to block 625.

According to some examples, responsive to a determination at block 643 that alignment of the content streams was not found by the media containers algorithm, flow proceeds to block 650. According to some examples, a determination is made whether the synchronization system 210 has access to the clear media of the payload(s) in the content stream(s) (block 650). In some cases, this is performed by the algorithm controller 320.

In some examples, access is available if the video and/or audio payload(s) is not encrypted, or if it is encrypted (e.g. because it is a premium content) but the system 210 has integration with DRM 260. Note that in some examples, the information indicative of the content streams information comprises at least a portion of a video payload, and/or at least a portion of an audio payload. Note that in some examples, analysis of the information indicative of the content streams indicates that one or more of the content streams are protected using Digital Rights Management (DRM).

In some example implementations (not illustrated in the figure), the system first tries the Segment Size Correlation algorithm if it was not already run, before trying the content payload algorithm below.

According to some examples, responsive to a determination at block 650 that system 210 does not have access to the clear media of the payload(s), flow proceeds to block 655. The process failed, e.g. in the sense disclosed with reference to block 627. In some example implementations (not illustrated in the figure), the system now tries the Segment Size Correlation algorithm if it was not already run, before determining that the timeline alignment process has failed.

According to some examples, a content payload algorithm is chosen and run (block 660). In some examples, this algorithm is configured to identify a correlation of content in respective media frames in respective content segments of the at least two content streams. These respective media frames can comprise one or more image frames and/or one or more audio frames. In some cases, the information indicative of the content streams comprises at least a portion of a video payload, and/or at least a portion of an audio payload.

In some examples, the identifying the correlation of content in the respective media frames comprises performing one or more of: a comparison of frame size, a checksum and a cyclic redundancy check (CRC). For example, a frame size of a first frame associated with URL 1, and a size of a second frame associated with URL 2, are determined to be the same. In other example, a CRC or a checksum is performed on both files, and the same result is obtained for both.

In some examples, the identifying of the correlation of content comprises performing analysis of compressed video headers. In some examples, the identifying of the correlation of content comprises identifying the correlation of content comprises analyzing codec headers and looking for e.g. Supplemental Enhancement Information (SEI) pic_timing messages. Such SEI messages are identified in the headers, and they are analyzed. In some examples, these fields, and their timestamps, are preserved, and can be analyzed.

In some examples, this analysis of codec headers is performed before decoding, and other analyses are performed at the level of the decoded frames.

In some examples, the identifying the correlation of content comprises comparing the visual and/or audio similarity of the respective media frames, e.g. comparing image data such as individual pixels, and correlating between them. For example, the algorithm determines that images in a first frame of URL 1, and in a second frame of URL 2, show the same graphical information in the same position on both—e.g. in certain pixels of both frames a white ball is seen.

Non-limiting example algorithms that can be used to compare frame images include: strict comparison, Fuzzy pixel comparison, Histogram Comparison, and Correlation comparison (such as PSNR or MSE).

Similarly, audio similarity between audio frames can be compared. That is, in some examples, the content payload algorithm performs, in block 660, comparison of audio content, that is audio frames, in place of, or in addition to, comparison of image frames. One non-limiting example use case for this, is where the two content streams in cases for example of different cameras 110, 112, but where the audio tracks are the same for both. In some examples, such a comparison of audio content involves lower processing complexity than running the Artificial Intelligence algorithm in block 670 (disclosed further herein).

Note that such a comparison of e.g. visual similarity can involve more complexity in processing. In some examples, such a comparison is advantageous if the two streams have different compression. In some examples, such a comparison is advantageous if the two streams are encoded into different formats. Some algorithms (for example, strict comparison) do not work well, in some cases, if the streams are associated with different encoders.

If the compression is not the same in the content streams, in some examples the algorithm decompresses and decodes them, and performs the analysis on the decoded frames. For example, where the algorithm performs an image level comparison, even if the two streams have the stream compression, it can be advantageous to decode the encoded (compressed) frames.

The algorithm can perform one or more of the above analyses, or others not disclosed herein, on some or all of the media frames of each content stream.

To increase the confidence of the determination, the algorithm in some implementations performs the comparison(s) on multiple frames within the sequence, and look for a statistically significant number of matches. Such a practice can also be useful in cases where the two streams have different quality, and one comparison might not clearly show a match.

If such matches are found, then Frame A of URL1 can be determined to the same content as Frame B of URL1. The correlated segment timestamps of the two frames are determined, and the segment timeline difference can be calculated. The timestamps in the manifest can thus be used to determine the synchronization. In some examples, responsive to identifying the correlation of content, the content payload algorithm is further configured to identify the synchronization point(s), and/or to calculate the timeline differences, based on the respective media frames.

A use case where content payload algorithm can be advantageous, is where both URLs have video captured by the same video camera, but the 2 URLs have different encoders and/or transcoders.

According to some examples, a determination is made whether alignment of the content streams was found by the content payload algorithm (block 663). In some cases, this is performed by the algorithm controller 320.

According to some examples, responsive to a determination at block 663 that alignment of the content streams was found by the content payload algorithm, flow proceeds to block 665. The process succeeded, e.g. in the sense disclosed with reference to block 625.

According to some examples, responsive to a determination at block 643 that alignment of the content streams was not found by the content payload algorithm, flow proceeds D to block 670 of FIG. 6C.

In some example implementations (not illustrated in the figure), the system now tries the segment size correlation algorithm if it was not already run, before choosing and trying the next algorithm.

According to some examples (not illustrated in the figure), a determination is made whether the synchronization system 210 has access to the clear media of the payload(s) in the content stream(s), similar to block 650. In some cases, this is performed by the algorithm controller 320. In the example of the figure, there is no reason to perform this. Since both the content payload algorithm and the artificial intelligence algorithm (disclosed below with reference to block 670) require access to the clear media of the payload(s), in the case of the figure this was performed already in block 650 and thus need not be repeated at this point in the process flow.

According to some examples, an artificial intelligence (AI) algorithm is chosen and run (block 670). In some examples, this algorithm is configured to identify a correlation of a context of content in the respective media frames, in respective content segments of the content streams. In some implementations, the identification is performed utilizing machine learning.

The AI can be used to identify frames with similar features in the content streams of the two (or more) URLs. In some examples, this algorithm is a computer vision algorithm.

Example use cases, in which this AI algorithm can be advantageous include a case where the content streams are from multiple encoders, or where the streams representing multiple different views of the action (for example multiple cameras 110, 114 capturing the football game from different angles).

In one non-limiting example, a frame A, associated with URL1 and a frame B, associated with URL2, both show the stadium clock 109, with time=10:32:43 AM. In the two streams 255, the clock appears in completely different portions of image frames, since the two cameras capture it from different angles. However, the AI identifies in both streams the image of a clock, and the time 10:32:43 AM. In another non-limiting example, two different cameras capture frames of the ball being kicked from the right to the left side of the field, from different angles. However, in both streams, a white circle can be seen moving in the same direction, passing a human in a green suit and then a human in a red suit, and passing past an advertising sign that contains particular images. The algorithm determines that both streams are showing the same content, that is the same moments in the action of the program.

Note that in some examples, the clock analyzed by the AI algorithm is not a physical clock 109 captured by a camera 110, but rather a virtual clock added to the images during production. Finding the movement of the ball, or the times on the clock 109, in both streams, are examples of identifying a correlation of a context of content in respective content segments, e.g. in respective media frames.

If such matches are found, then Frame A of URL1 is the same content as Frame B of URL1. Thus the correlated segment timestamps of the frames are determined, and the timeline difference can be determined. That is, responsive to identifying the correlation of the context of the content, the artificial intelligence algorithm is further configured to identify synchronization point(s), and/or to calculated the difference(s) in timelines, based on the respective media frames.

According to some examples, a determination is made whether alignment of the content streams was found by the AI algorithm (block 673). In some cases, this is performed by the algorithm controller 320.

According to some examples, responsive to a determination at block 673 that alignment of the content streams was found by the AI algorithm, flow proceeds to block 675. The process succeeded, e.g. in the sense disclosed with reference to block 625.

According to some examples, responsive to a determination at block 643 that alignment of the content streams was not found by the media containers algorithm, flow proceeds to block 677. The process has failed, e.g. in the sense disclosed with reference to block 627. In some example implementations (not illustrated in the figure), the system now tries the Segment Size Correlation algorithm if it was not already run, before determining that the timeline alignment process has failed.

Note that in the above example of FIGS. 6, the choosing of an algorithm comprises performing an incremental algorithm selection. The flow 660 starts with a first-choice algorithm. Responsive to the synchronization points not being identified, and the timeline difference not being calculated, by this algorithm, a series of next-choice algorithms are chosen and run. In the example of the figure, the incremental algorithm selection is performed in a pre-defined order. In these examples, the pre-defined order is based at least on at least one defined criterion parameter. In this example, the criterion parameter(s) comprise a complexity criterion, and the incremental algorithm selection is based on choosing the next-choice algorithm based on an order of increased complexity. For example, the flow 600 can be based on a computational complexity, considering the utilization of the processor 220. Algorithms with a comparatively low computational complexity (such as the manifest timeline algorithm and the segment size correlation algorithm) are performed earlier in the flow, in preference to algorithms (such as the content payload algorithm and the artificial intelligence algorithm) with a comparatively higher computational complexity.

Note that in the non-limiting example of FIG. 6, the process of choosing an algorithm follows a predefined flow chart or tree. The flow is based on criteria, e.g. computational complexity.

Other examples of a complexity criterion include a storage-needs complexity and a communications bandwidth complexity, and a requirement for DRM. In some cases, the requirement that synchronization system 210 be integrated with DRM system 260 adds complexity to the architecture of the solution 200.

In the non-limiting illustrative example of the figure, the pre-defined order is as follows:
   a. the manifest timeline algorithm;
   b. the segment size correlation algorithm;
   c. the media container algorithm;
   d. the content payload algorithm; and
   e. the artificial intelligence algorithm.

In some non-limiting examples, the defined criterion parameter(s) is associated with algorithm characteristics, e.g. with algorithm performance. Examples of such algorithms include various complexity criteria, as disclosed above.

Another example such defined criterion parameter is an indication of DRM integration of the content synchronization system 210. The system may have DRM integration for certain contents (TV Channel 57), and not for others (certain sports networks), and thus the choice of algorithms, including the order of their choice, may be different for the two different contents.

Another example defined criterion parameter, associated with algorithm characteristics and performance, is an indication of past content characteristics associated with the content streams, as disclosed herein with reference to stream characteristics learning module 330. For example, machine learning teaches the system certain information based on past behavior of content streams associated with a particular URL. As one non-limiting example, module 330 learns that TV channel 57 always use a particular transcoder, or is almost always of the DASH protocol. In some examples of this, the system also learns that certain content streams are associated with a particular DRM schema. Identifying the same exact URL can be indicative of the same exact content, but identifying URL schema or characteristics (for example CDN Fully Qualified Domain Name (FQDN)) can facilitate determination that it is a live stream coming from the same origin. Because it is coming from the same origin, likely it has same the architecture. The system can thus conclude that an algorithm, which worked on other content of this origin, is likely to work also for the present content.

Note that depending on the particular defined criterion parameter(s), associated with algorithm characteristics and performance, that is used to choose algorithms, the choice of algorithms, and the order of choices, may be different. For example, if one criterion is whether there is DRM integration, then if there is DRM integration to a particular content source 250, and if the content is DRM-protected, algorithms such as content payload algorithm, the machine learning algorithm and/or the media containers algorithm may or may not be relevant candidates from which to choose, and also they may appear higher or earlier in the order of choice of algorithm. Similarly, if past content characteristics associated with the content streams exist, derived e.g. from machine learning by module 330, these characteristics may lead to a difference choice of algorithms, and in a different order, than if past content characteristics associated with the content streams do not exist in the system.

Another example defined criterion parameter, associated with algorithm characteristics and performance, is a probability parameter, indicative of a probability of success using a particular algorithm. For example, one or more of the algorithms can provide a score of probability of correctness of the synchronization point(s)/timeline differences. Based on that, algorithm controller 210 can decide whether to continue with another algorithm, or to accept the result provided by the algorithm that was previously run. Thus, for example, if the quality parameter indicates that the particular content X (a football game) must be correlated with at least an 80% probability, and the first algorithm run reports a probability of 60% that the resulting correlation is correct, the decision may be to run another algorithm and try to achieve the 80% probability. On the other hand, another criterion parameter indicates that content Y (a game show) must be correlated with only an 50% probability. For such a content, a probability of 60% is good enough, and a second algorithm need not be run.

Note that in some examples, such a criterion has an effect which is somewhat different than some of the other criteria discussed herein. Some others dictate which algorithms to run, in which order. By contrast, in some examples a probability parameter can be applied independent of the order of algorithms chosen. It can determine whether to stop after performance of a particular algorithm, or whether to continue to the next algorithm.

In another example, a probability is associated with at least some algorithms before the choice of algorithms starts for a newly received content. For example, based at least partly on the indication of past content characteristics, derived by the running of learning module 330, the system 210 knows that algorithm A will likely find the correct synchronization of content X with a 55% probability—that is the probability of synching contents of that particular nature. Since content X must be correlated with at least an 80% probability, the controller 320 will not bother to run algorithm A at all, and will instead pick another algorithm. That is, algorithm A is ruled out of the relevant candidate list. Similarly, another example of a defined criterion parameter, associated with algorithm characteristics and performance, is a parameter of required synchronization quality. In one example, it is required that the synchronization of content X be performed with a certain quality, e.g. a certain accuracy, e.g. within 5 milliseconds. In such a case, it can be that the choosing of the algorithm is based at least partly on an expected synchronization quality associated with a particular algorithm. Thus, for example, it is known, based at least partly on the indication of past content characteristics, that algorithm B usually gives synchronization of two streams which is accurate within 20 milliseconds, e.g. for contents of this type. In this example, the requirement is for a synchronization accuracy of 10 milliseconds. Thus, the expected performance of algorithm B is insufficient per the requirement, and algorithm B is ruled out and skipped.

In another example, the running of the algorithm B provides a quality score. Responsive to this quality score not meeting the parameter of required synchronization quality, the controller 320 chooses a next-choice algorithm.

Thus the particular criteria parameters used for choice of algorithms for a particular set of content streams 255, content sources 250 etc., and the particular content streams analyzed, can result in different choices of algorithms, and in different orders. It should thus be noted again the set of algorithms considered, and the particular order, of FIG. 6, are only illustrative non-limiting examples.

It was disclosed above herein that in some cases, a determination is made that the computerized content synchronization system does not possess, external to the information indicative of at least two content streams, information concerning characteristics of a content pipeline architecture of each content stream of the content streams, which is capable of relating timelines of the at least two content streams. One example of such a determination is a determination that the computerized content synchronization system 210 is not integrated with one or more pipelines of distinct content pipelines associated with the multiple content streams. Other such examples are a determination that the synchronization system lacks information whether:

a) the content streams 255 are associated with a single content-capture device 110.
b) the content streams are associated with a single encoder 116.
c) the content streams are associated with a single encoder, utilizing Encoder Boundary Point (EBP) based packaging.
d) the content streams are associated with more than one encoder, utilizing Encoder Boundary Point (EBP) based packaging, and the encoders are time synched.
e) the content streams are associated with a single encoder 116, and utilize e.g. AVC and HEVC SEI pic_timing messages.
f) the content streams are associated with more than one encoder, utilizing e.g. AVC and HEVC SEI pic_timing messages, and the encoders are time synched.
g) the content streams are associated with a single transcoder 122.
h) the content streams are associated with a single packager 124.
i) the content streams are associated with more than one packager, utilizing EBP or SEI in the source for packaging.
j) the content streams are associated with more than one packager, which are time synched between each other.

Another such example of such a determination is a determination that the system lacks information about a packager protocol (e.g. HLS vs DASH) utilized by each content stream.

By contrast, in some examples, responsive to a determination by the system 210 that is does possess, external to the information indicative of at least two content streams, information concerning characteristics of a content pipeline architecture of each content stream of the content streams, such as the above-disclosed, which is capable of relating timelines of the at least two content streams, the controller can behave in a somewhat different manner. As disclosed, for example, with reference to block 525, the controller can, in some implementations, choose the algorithm(s) based at least on this information concerning characteristics of the content pipeline architecture.

Other examples of a priori information, external to the content streams, include information indicating which URLs are associated with which content-capture devices, that two URLs are associated with two different cameras (and thus it is clear that the machine learning algorithm should be used), or which URLs have synchronized timelines with each other. Another example is providing timestamps of frames, in the same clock, or what is the timeline difference between matched frames in manifest segments.

Another example is a priori knowledge concerning use different encoders. One such example, is where information is provided that one stream uses 4K (high resolution) images. Even if the same camera is used, the encoder, transcoder and packager can be different. Thus, when synching 4K with regular high-definition video, it can be that image processing using e.g. content payload algorithm must be used.

Another example is providing system 210 architecture information about the pipeline of a particular content provider, e.g. "the streams use one head-end, with one transcoder and one packager, which packages to two different delivery protocols, HLS and DASH".

Another example is where the system 210 is informed a priori that the manifest will always have a certain tag which are from the same time line, in the multiple streams.

In some embodiments, one or more steps of the flowchart exemplified herein may be performed automatically. The flow and functions illustrated in the flowchart FIGS. may for example be implemented in systems 210, 280, 285, 220, and in processing circuitries 215, 415, and may make use of components described with regard to FIGS. 1 to 4. It is also noted that whilst the flowchart is described with reference to system elements that realize steps, such as for example systems 210, 280, 285, 220, and processing circuitry 215, 415, this is by no means binding, and the operations can be carried out by elements other than those described herein.

It is noted that the teachings of the presently disclosed subject matter are not bound by the flowcharts illustrated in the various figures. The operations can occur out of the illustrated order. One or more stages illustrated in the figures can be executed in a different order and/or one or more groups of stages may be executed simultaneously. For example, steps 505, 510 and 515, shown in succession, can be executed substantially concurrently, or in a different order. For example, steps 540 and 545, shown in succession, can be executed substantially concurrently, or in a different order.

Similarly, some of the operations or steps can be integrated into a consolidated operation, or can be broken down into several operations, and/or other operations may be added. As a non-limiting example, in some cases blocks 540 and 545 can be combined.

In embodiments of the presently disclosed subject matter, fewer, more and/or different stages than those shown in the figures can be executed. As one non-limiting example, certain implementations may not include blocks 520 and/or 525.

In the claims that follow, alphanumeric characters and Roman numerals, used to designate claim elements such as components and steps, are provided for convenience only, and do not imply any particular order of performing the steps.

It should be noted that the word "comprising" as used throughout the appended claims, is to be interpreted to mean "including but not limited to".

While there has been shown and disclosed examples in accordance with the presently disclosed subject matter, it will be appreciated that many changes may be made therein without departing from the spirit of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be, at least partly, a suitably programmed computer. Likewise, the presently disclosed subject matter contemplates a computer program product being readable by a machine or computer, for executing the method of the presently disclosed subject matter, or any part thereof. The presently disclosed subject matter further contemplates a non-transitory machine-readable or computer-readable memory tangibly embodying a program of instructions executable by the machine or computer for to executing the method of the presently disclosed subject matter or any part thereof. The presently disclosed subject matter further contemplates a non-transitory computer readable storage medium having a computer readable program code embodied therein, configured to be executed so as to perform the method of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A computerized content synchronization system, comprising a processing circuitry, the processing circuitry configured to perform a method, the method comprising performing the following:
   a. obtaining, from one or more content delivery systems, information indicative of at least two content streams, the at least two content streams associated with a shared content;
   b. providing a plurality of algorithms, each algorithm of the plurality of algorithms being configured to perform at least one of: identify, within the information indicative of the at least two content streams, one or more synchronization points between the at least two content streams; and calculate a timeline difference between the at least two content streams,
      wherein at least one algorithm of the plurality of algorithms is configured to synchronize exclusive of a synchronization based on audio signal content;
   c. performing a determination whether or not the computerized content synchronization system possesses, external to the information indicative of the at least two content streams, information concerning characteristics of a content pipeline architecture of each content stream of the at least two content streams,
      wherein the information concerning the characteristics is capable of relating timelines of the at least two content streams,
      the information concerning the characteristics constituting external information;
   d. responsive to a determination that the computerized content synchronization system does possess the external information-, performing one of the following:
      (1) choosing an algorithm of the plurality of algorithms, based at least on the information concerning the characteristics, and running the chosen algorithm to at least one of: identify the at least one synchronization point; and calculate the timeline difference; and
      (2) calculating the time difference without running an algorithm; and
   e. responsive to a determination that the computerized content synchronization system does not possess the external information, iteratively performing the following steps:
      (i) choosing, from among the plurality of algorithms, an algorithm not previously chosen, based at least on at least one defined criterion parameter associated with algorithm characteristics, and on an analysis of the information indicative of the at least two content streams, the algorithm not previously chosen constituting a chosen algorithm;

(ii) running the chosen algorithm to attempt to at least one of: identify the at least one synchronization point; and calculate the timeline difference;

(iii) responsive to reaching synchronization,
providing at least one of: the at least one synchronization point; and the timeline difference, thereby facilitating a synchronized consumption of the shared content by at least one consumer, wherein the at least one consumer is configured to consume the at least two content streams.

2. The computerized content synchronization system of claim 1, wherein the at least two content streams are at least one of: associated respectively with at least two distinct content pipelines; and associated respectively with at least two distinct content delivery protocols.

3. The computerized content synchronization system of claim 1, wherein the at least one defined criterion parameter comprises at least one of:
a complexity criterion;
a probability parameter indicative of a required probability, of identifying the at least one synchronization point or calculating the timeline difference, using the algorithm;
a parameter of required synchronization quality;
an indication of past content characteristics associated with at least one content stream of the at least two content streams; and
an indication of DRM integration of the computerized content synchronization system.

4. The computerized content synchronization system of claim 1, wherein the information indicative of the at least two content streams comprising at least one of a content payload and content metadata.

5. The computerized content synchronization system of claim 1, wherein the incremental algorithm selection is performed at least partly in a pre-defined order, the pre-defined order being based at least on the at least one defined criterion parameter.

6. The computerized content synchronization system of claim 1, wherein the plurality of algorithms comprises a manifest timeline algorithm,
wherein the manifest timeline algorithm is configured to identify an at least partial overlap of respective manifest timelines in respective manifests associated with the at least two content streams.

7. The computerized content synchronization system of claim 1, wherein the chosen algorithm is further configured, in response to at least one of the identification of the at least one synchronization point and the calculation of the timeline difference, to identify a successive sequence of segments of a configured length in which at least one of: synchronization points are identified and the timeline difference is calculated,
wherein, responsive to identifying the successive sequence, the chosen algorithm is further configured to perform, based on the successive sequence, at least one of the identification of the at least at least one synchronization point and the calculation of the timeline difference.

8. The computerized content synchronization system of claim 1, wherein the plurality of algorithms comprises a segment size correlation algorithm, the segment size correlation algorithm configured to calculate correlation between successive segment sizes of respective content segments of the at least two content streams over time, wherein, responsive to finding a correlation based on the calculated correlation level, the segment size correlation algorithm is further configured to identify the at least at least one synchronization point based on correlated segments of the at least two content streams over time.

9. The computerized content synchronization system of claim 1, wherein the plurality of algorithms comprises a media container algorithm,
the media container algorithm configured to identify at least one identical decode time in respective media containers of at least some respective content segments of the at least two content streams,
wherein, responsive to identifying the at least one identical decode time, the media container algorithm is further configured to identify the at least at least one synchronization point, based on the least one identical decode time.

10. The computerized content synchronization system of claim 1, wherein the plurality of algorithms comprises a content payload algorithm,
the content payload algorithm configured to identify a correlation of content in respective content segments of the at least two content streams,
wherein, responsive to identifying the correlation of content, the content payload algorithm is further configured to identify the at least one synchronization point, based on the respective content segments.

11. The computerized content synchronization system of claim 10, wherein the identifying the correlation of content comprises comparing at least one of a visual similarity and an audio similarity of the respective media frames.

12. The computerized content synchronization system of claim 1, wherein the plurality of algorithms comprises an artificial intelligence algorithm, the artificial intelligence algorithm configured to identify a correlation of a context of content in respective content segments of the at least two content streams, the identification performed utilizing machine learning,
wherein, responsive to identifying the correlation of the context of the content, the artificial intelligence algorithm is further configured to, based on the respective content segments, perform at least one of: identify the at least at least one synchronization point; and calculate the timeline difference.

13. The computerized content synchronization system of claim 1, wherein the choosing of the algorithm comprises choosing the algorithms in the following order:
A. a manifest timeline algorithm;
B. a segment size correlation algorithm;
C. a media container algorithm;
D. a content payload algorithm; and
E. an artificial intelligence algorithm.

14. The computerized content synchronization system of claim 1, wherein the at least two content streams comprise Adaptive Bit Rate (ABR) content streams.

15. The computerized content synchronization system of claim 1, wherein the one or more content delivery systems are comprised in one or more content pipelines, the one or more content pipelines further comprising a content preparation system and a content delivery system, wherein the determination that the computerized content synchronization system does not possess comprises a determination that the computerized content synchronization system is not integrated with the one or more content pipelines, and/or a determination that the computerized content synchronization system lacks at least one of the following:

A. information whether the at least two content streams are associated with a single content-capture device;
B. information whether the at least two content streams are associated with the single encoder, the single encoder utilizing Encoder Boundary Point (EBP) based packaging;
C. information that the content streams are associated with more than one encoder, utilizing Encoder Boundary Point (EBP) based packaging, and the encoders are time synched;
D. information that the content streams are associated with a single encoder, and utilize e.g. AVC and HEVC SEI pic timing messages;
E. information that the content streams are associated with more than one encoder, utilizing e.g. AVC and HEVC SEI pic timing messages, and the encoders are time synched;
F. information that the computerized content synchronization system lacks information whether the at least two content streams are associated with a single transcoder;
G. information whether the at least two content streams are associated with a single packager;
H. information that the content streams are associated with more than one packager, utilizing EBP or SEI in the source for packaging;
I. information that the content streams are associated with more than one packager, which are time synched between each other; and
J. information about a packager protocol utilized by the each content stream.

16. The computerized content synchronization system of claim 1, wherein the providing of step comprises outputting the timeline difference to at least one consumer system.

17. A computerized content synchronization method, capable of being performed by a computerized content synchronization system comprising a processing circuitry, the method comprising performing the following:
   a. obtaining, from one or more content delivery systems, information indicative of at least two content streams, the at least two content streams associated with a shared content;
   b. providing a plurality of algorithms, each algorithm of the plurality of algorithms being configured to perform at least one of: identify, within the information indicative of the at least two content streams, one or more synchronization points between the at least two content streams; and calculate a timeline difference between the at least two content streams,
      wherein at least one algorithm of the plurality of algorithms is configured to synchronize exclusive of a synchronization based on audio signal content;
   c. performing a determination whether or not the computerized content synchronization system possesses, external to the information indicative of at least two content streams,
      information concerning characteristics of a content pipeline architecture of each content stream of the at least two content streams,
   wherein the information concerning the characteristics is capable of relating timelines of the at least two content streams,
      the information concerning the characteristics constituting external information;
   d. responsive to a determination that the computerized content synchronization system does possess the external information, performing one of the following:
      (1) choosing an algorithm of the plurality of algorithms, based at least on the information concerning the characteristics, and running the chosen algorithm to at least one of: identify the at least one synchronization point; and calculate the timeline difference; and
      (2) calculating the time difference without running an algorithm; and
   e. responsive to a determination that the computerized content synchronization system does not possess the external information, iteratively performing the following steps, until reaching synchronization or until no available algorithms remain-:
      (i) choosing, from among the plurality of algorithms, an algorithm not previously chosen, based at least on at least one defined criterion parameter associated with algorithm characteristics, and on an analysis of the information indicative of the at least two content streams,
         the algorithm not previously chosen constituting a chosen algorithm;
      (ii) running the chosen algorithm to attempt to at least one of: identify the at least one synchronization point; and calculate the timeline difference;
      (iii) responsive to reaching synchronization,
         providing at least one of: the at least one synchronization point; and the timeline difference,
   thereby facilitating a synchronized consumption of the shared content by at least one consumer, wherein the at least one consumer is configured to consume the at least two content streams.

18. A non-transitory computer readable storage medium tangibly embodying a program of instructions that, when executed by a computerized content synchronization system, cause the computer to perform a computerized method, the method being performed by a processing circuitry of the computerized content synchronization system and comprising performing the following actions:
   a. obtaining, from one or more content delivery systems, information indicative of at least two content streams, the at least two content streams associated with a shared content;
   b. providing a plurality of algorithms, each algorithm of the plurality of algorithms being configured to perform at least one of: identify, within the information indicative of the at least two content streams, one or more synchronization points between the at least two content streams; and calculate a timeline difference between the at least two content streams,
      wherein at least one algorithm of the plurality of algorithms is configured to synchronize exclusive of a synchronization based on audio signal content;
   c. performing a determination whether or not the computerized content synchronization system possesses, external to the information indicative of at least two content streams,
      information concerning characteristics of a content pipeline architecture of each content stream of the at least two content streams,
   wherein the information concerning the characteristics is capable of relating timelines of the at least two content streams,
      the information concerning the characteristics constituting external information;
   d. responsive to a determination that the computerized content synchronization system does possess the external information, performing one of the following:

(1) choosing an algorithm of the plurality of algorithms, based at least on the information concerning the characteristics, and running the chosen algorithm to at least one of: identify the at least one synchronization point; and calculate the timeline difference; and
(2) calculating the time difference without running an algorithm; and e. responsive to a determination that the computerized content synchronization system does not possess the external information, iteratively performing the following steps, until reaching synchronization or until no available algorithms remain:
   (i) choosing, from among the plurality of algorithms, an algorithm not previously chosen, based at least on at least one defined criterion parameter associated with algorithm characteristics, and on an analysis of the information indicative of the at least two content streams,
      the algorithm not previously chosen constituting a chosen algorithm;
   (ii) running the chosen algorithm to attempt to at least one of: identify the at least one synchronization point; and calculate the timeline difference;
   (iii) responsive to reaching synchronization, providing at least one of: the at least one synchronization point; and the timeline difference, thereby facilitating a synchronized consumption of the shared content by at least one consumer, wherein the at least one consumer is configured to consume the at least two content streams.

\* \* \* \* \*